(12) United States Patent
Parrish et al.

(10) Patent No.: US 10,803,539 B2
(45) Date of Patent: Oct. 13, 2020

(54) APPARATUS, SYSTEM, AND METHOD SUPPORTING COMPLIANCE WITH CUSTOMS/BORDER REQUIREMENTS

(71) Applicant: Dallas/Fort Worth International Airport Board, DFW Airport, TX (US)

(72) Inventors: John M. Parrish, Fort Worth, TX (US); Kelly C. Tuggle, North Richland Hills, TX (US); Stephen Shaffer, Corinth, TX (US)

(73) Assignee: Dallas/Fort Worth International Airport Board, DFW Airport, TX (US)

( * ) Notice: Subject to any disclaimer, the term of this patent is extended or adjusted under 35 U.S.C. 154(b) by 225 days.

(21) Appl. No.: 15/339,532

(22) Filed: Oct. 31, 2016

(65) Prior Publication Data

US 2017/0046808 A1 Feb. 16, 2017

Related U.S. Application Data

(63) Continuation-in-part of application No. 14/491,496, filed on Sep. 19, 2014.
(Continued)

(51) Int. Cl.
*G06Q 50/26* (2012.01)
*G06Q 30/00* (2012.01)
(Continued)

(52) U.S. Cl.
CPC ........... *G06Q 50/26* (2013.01); *G06K 7/1417* (2013.01); *G06Q 10/00* (2013.01); *G06Q 30/018* (2013.01); *G06Q 50/265* (2013.01)

(58) Field of Classification Search
CPC combination set(s) only.
See application file for complete search history.

(56) References Cited

U.S. PATENT DOCUMENTS 6,085,976 A 7/2000 Sehr
6,786,401 B2 9/2004 Kimoto et al.
(Continued)

FOREIGN PATENT DOCUMENTS

WO 2008097335 A2 8/2008

OTHER PUBLICATIONS

Transportation Security Administration, TSA Pre-Check FAQ, Aug. 12, 2016, "https://web.archive.org/web/20160812155229/https://www.tsa.gov/precheck/faq".*
(Continued)

*Primary Examiner* — Minnah L Seoh
*Assistant Examiner* — Wenren Chen

(57) ABSTRACT

A method includes receiving, at a portable device, information associated with a traveler. The information includes information from a passport of the traveler, a photograph of the traveler, and travel-related information associated with the traveler. The method also includes wirelessly transmitting at least a portion of the information to an external system and receiving a disposition code from the external system. The disposition code indicates whether the traveler is allowed to pass a customs/border enforcement area or is required to enter the customs/border enforcement area for additional processing. The method further includes presenting the disposition code or information associated with the disposition code on a display of the portable device.

24 Claims, 11 Drawing Sheets

Related U.S. Application Data

(60) Provisional application No. 61/880,671, filed on Sep. 20, 2013.

(51) Int. Cl.
  *G06K 7/14* (2006.01)
  *G06Q 10/00* (2012.01)

(56) References Cited

U.S. PATENT DOCUMENTS

| | | |
|---|---|---|
| 2002/0169692 A1 | 11/2002 | Dutta et al. |
| 2002/0198731 A1 | 12/2002 | Barnes et al. |
| 2004/0078335 A1 | 4/2004 | Calvesio et al. |
| 2004/0172364 A1 | 9/2004 | Murray et al. |
| 2007/0158418 A1 | 7/2007 | Weekes |
| 2009/0322866 A1* | 12/2009 | Stotz .................... G07C 9/257 348/77 |
| 2010/0051679 A1 | 3/2010 | Molloy et al. |
| 2013/0027187 A1 | 1/2013 | Yepez |
| 2013/0070974 A1 | 3/2013 | Stefani |
| 2014/0070946 A1* | 3/2014 | Ambrefe, Jr. ......... G06F 3/0482 340/541 |
| 2014/0108263 A1* | 4/2014 | Ortiz .................. G06Q 20/3278 705/71 |
| 2014/0279648 A1* | 9/2014 | Whitehouse ......... G06Q 10/083 705/330 |
| 2015/0088778 A1* | 3/2015 | Tsao ..................... G06Q 50/265 705/325 |
| 2016/0078581 A1* | 3/2016 | Maher .................... G06F 16/83 705/325 |

OTHER PUBLICATIONS

International Search Report dated Dec. 30, 2014 in connection with International Patent Application No. PCT/US2014/056482, 4 pages.
Written Opinion of International Searching Authority dated Dec. 30, 2014 in connection with International Patent Application No. PCT/US2014/056482, 4 pages.

* cited by examiner

APPARATUS, SYSTEM, AND METHOD SUPPORTING COMPLIANCE WITH CUSTOMS/BORDER REQUIREMENTS

CROSS-REFERENCE TO RELATED APPLICATIONS AND PRIORITY CLAIM

This application is a continuation-in-part of U.S. patent application Ser. No. 14/491,496 filed on Sep. 19, 2014, which claims priority under 35 U.S.C. § 119(e) to U.S. Provisional Patent Application No. 61/880,671 filed on Sep. 20, 2013. The contents of the above-identified patent applications are hereby incorporated by reference in their entirety.

TECHNICAL FIELD

This disclosure relates generally to customs/border compliance. More specifically, this disclosure relates to an apparatus, system, and method supporting compliance with customs/border requirements.

BACKGROUND

Many countries typically require visitors or returning citizens or residents to clear customs/border checkpoints before entering those countries. Among other things, enforcement officers at customs/border checkpoints can verify that people attempting to enter a specific country are legally allowed entry and are complying with various local laws. The enforcement officers may also attempt to identify whether people trying to enter a specific country are a security threat. In some locations, customs/border checkpoints can become very crowded. For instance, the customs/border checkpoints at a busy international airport can easily become overwhelmed by a large number of arriving passengers. This can lead to long lines and excessive wait times at the customs/border checkpoints.

SUMMARY

This disclosure provides an apparatus, system, and method supporting compliance with customs/border requirements.

In a first embodiment, a method includes receiving, at a portable device, information associated with a traveler. The information includes information from a passport of the traveler, a photograph of the traveler, and travel-related information associated with the traveler. The method also includes wirelessly transmitting at least a portion of the information to an external system and receiving a disposition code from the external system. The disposition code indicates whether the traveler is allowed to pass a customs/border enforcement area or is required to enter the customs/border enforcement area for additional processing. The method further includes presenting the disposition code or information associated with the disposition code on a display of the portable device.

In a second embodiment, an apparatus includes at least one processor configured to receive information associated with a traveler. The information includes information from a passport of the traveler, a photograph of the traveler, and travel-related information associated with the traveler. The apparatus also includes a transceiver configured to wirelessly transmit at least a portion of the information to an external system and receive a disposition code from the external system. The disposition code indicates whether the traveler is allowed to pass a customs/border enforcement area or is required to enter the customs/border enforcement area for additional processing. The apparatus further includes a display configured to present the disposition code or information associated with the disposition code.

In a third embodiment, a non-transitory computer readable medium contains instructions that, when executed by at least one processor of a portable device, cause the at least one processor to receive information associated with a traveler at the portable device. The information includes information from a passport of the traveler, a photograph of the traveler, and travel-related information associated with the traveler. The medium also contains instructions that, when executed by the at least one processor, cause the at least one processor to initiate wireless transmission of at least a portion of the information to an external system and receive a disposition code from the external system. The disposition code indicates whether the traveler is allowed to pass a customs/border enforcement area or is required to enter the customs/border enforcement area for additional processing. The medium further contains instructions that, when executed by the at least one processor, cause the at least one processor to present the disposition code or information associated with the disposition code on a display of the portable device.

In a fourth embodiment, a method includes receiving, from a portable device of a traveler, information associated with the traveler. The information includes information from a passport of the traveler, a photograph of the traveler, and travel-related information associated with the traveler. The method also includes providing at least a portion of the information to an external system and receiving a disposition code from the external system. The disposition code indicates whether the traveler is allowed to pass a customs/border enforcement area or is required to enter the customs/border enforcement area for additional processing. The method further includes providing the disposition code or information associated with the disposition code to the portable device for presentation on a display of the portable device.

In a fifth embodiment, a system includes at least one computing device configured to receive, from a portable device of a traveler, information associated with the traveler. The information includes information from a passport of the traveler, a photograph of the traveler, and travel-related information associated with the traveler. The at least one computing device is also configured to provide at least a portion of the information to an external system and receive a disposition code from the external system. The disposition code indicates whether the traveler is allowed to pass a customs/border enforcement area or is required to enter the customs/border enforcement area for additional processing. The at least one computing device is further configured to provide the disposition code or information associated with the disposition code to the portable device for presentation on a display of the portable device.

In a sixth embodiment, a non-transitory computer readable medium contains instructions that, when executed by at least one processor, cause the at least one processor to receive, from a portable device of a traveler, information associated with the traveler. The information includes information from a passport of the traveler, a photograph of the traveler, and travel-related information associated with the traveler. The medium also contains instructions that, when executed by the at least one processor, cause the at least one processor to provide at least a portion of the information to an external system and receive a disposition code from the external system. The disposition code indicates whether the traveler is allowed to pass a customs/border enforcement area or is required to enter the customs/border enforcement area for additional processing. The medium further contains instructions that, when executed by the at least one processor, cause the at least one processor to provide the disposition code or information associated with the disposition code to the portable device for presentation on a display of the portable device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 12C, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
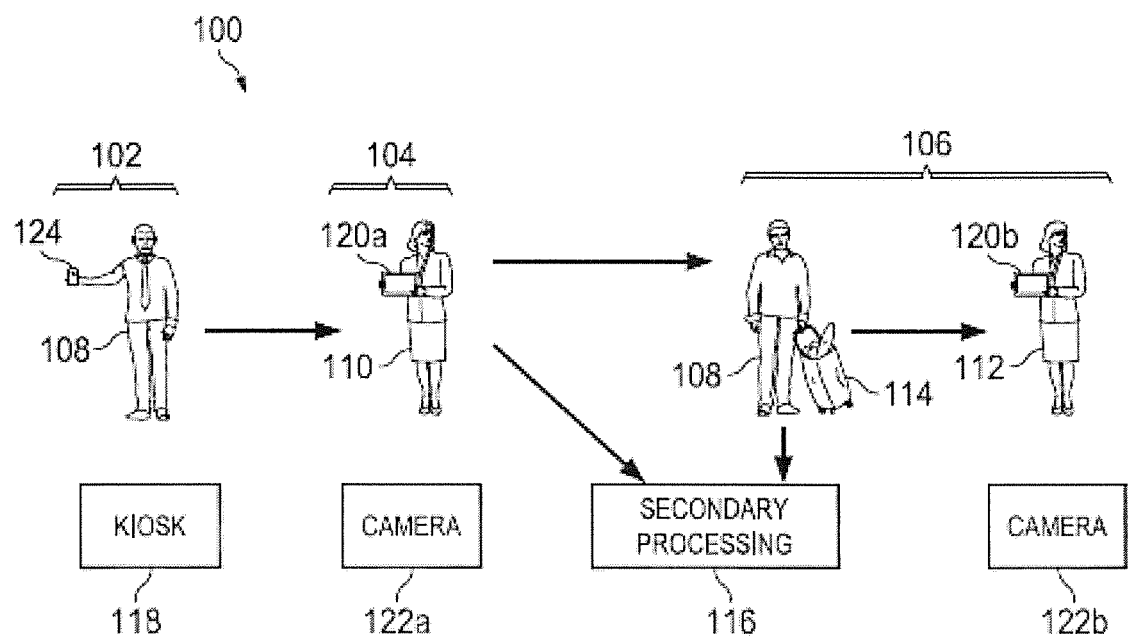
FIG. 1 illustrates an example customs/border enforcement scheme at an airport or other location according to this disclosure.

FIG. 1 illustrates an example customs/border enforcement scheme 100 at an airport or other location according to this disclosure. As shown in FIG. 1, the customs/border enforcement scheme 100 is generally divided into three stages 102-106. The first stage 102 denotes an initial contact point where a traveler 108 provides information for customs or border enforcement purposes. The second stage 104 denotes a disposition area where an initial assessment is made of whether the traveler 108 is allowed to pass. In some embodiments, the assessment may be made by one or more customs/border personnel 110. For example, the customs/border personnel 110 in the disposition area may perform an initial review of the traveler's information and indicate whether the traveler 108 is allowed to proceed, such as to a baggage claim area. In other embodiments, the assessment may be made automatically by an automated customs/border routine based on the traveler's information. The third stage 106 denotes an egress area where a final assessment is made of whether the traveler 108 (with his or her luggage 114) is allowed to pass. The final assessment may be made by additional customs/border personnel 112, or the final assessment may be made automatically by an automated customs/border routine.

At any point within this process, the traveler 108 (with or without his or her luggage 114) can be directed to a secondary processing area 116. The secondary processing area 116 generally denotes an area where additional screening of travelers occurs. The additional screening could take various forms, such as searches of luggage or travelers, chemical residue tests, in-person interviews, and the like.

As shown in FIG. 1, to help speed up the customs/border enforcement process, the traveler 108 interacts with a kiosk 118, the traveler's portable device 124 (such as a mobile telephone, smartphone, personal digital assistant, laptop computer, wrist computer, or tablet computer), or a combination of the two. The kiosk 118 represents an electronic system that can be used by travelers wishing to pass through a customs or border checkpoint. As described in more detail below, the kiosk 118 can be used to scan a traveler's passport and collect or verify information about the traveler. Any suitable mechanism(s) could be used to scan a traveler's passport, such as a "machine readable zone" (MRZ) optical scanner or a radio frequency identification (RFID) reader.

The information about the traveler 108 could include travel information, such as the airline flight on which the traveler 108 arrived. The information about the traveler 108 could also include biometric information, such as fingerprints, facial images, or retinal or iris scans. The information about the traveler 108 could further include the traveler's answers to various questions asked in customs/border declaration forms. Example declarations can include a declaration whether the traveler 108 is carrying currency or monetary instruments in excess of a threshold amount and a declaration whether the traveler is complying with "duty free" exemptions. Other example declarations can include a declaration whether the traveler 108 is bringing food, plants, or animals into the country and a declaration whether the traveler had close contact with livestock while outside the country. In addition, the information about the traveler 108 could include one or more photographs of the traveler 108. Any other or additional declarations or other information about the traveler 108 can be collected by the kiosk 118, by the traveler's portable device 124, or a combination of the two.

In some embodiments, the traveler's portable device 124 could be used to initially collect traveler information. For example, the portable device 124 could execute an "app" or other application that collects various information from the traveler 108, or the portable device 124 could allow the traveler 108 to access a website or other computing resource and provide information about the traveler 108 for collection at a remote site. Collection of some or all of the traveler information could occur initially, e.g., while the traveler 108 is still en route and not yet arrived at an airport, while the traveler 108 is taxiing to the gate, while walking from the plane to the customs/border enforcement area, or at any other point before the traveler 108 arrives at the customs/border enforcement area. The portable device 124 could then relay that information to a customs/border enforcement system or to the kiosk 118 for further data gathering (e.g., traveler fingerprints).

If the traveler information collected by the portable device 124 is complete and does not include any discrepancies or errors, the traveler 108 may be able to bypass the kiosk 118 completely. If any of the traveler information collected by the portable device 124 is incomplete or contains one or more errors or other discrepancies, the traveler may have to see one of the customs/border personnel 110-112 to provide the missing information or correct any error(s). For example, some portable devices may not be able to accurately scan or capture fingerprints, retinas, irises, facial images, or other biometric information.

In some embodiments, the traveler's portable device 124 may receive a QR code, bar code, or other suitable indicator that can be displayed on the display of the portable device 124. Such a displayed indicator can be scanned at the kiosk 118, by one of the customs/border personnel 110-112, or at an egress area of the customs/border enforcement area. This may allow, for example, a kiosk or other device to scan the indicator and then retrieve information associated with the traveler 108 from a local or remote location.

Depending on the implementation, various operations could occur using the kiosk 118. For example, in some embodiments, the kiosk 118 could print a paper receipt or other document that is provided to the traveler 108 after verifying the traveler's passport and collecting/verifying information about the traveler 108. The traveler 108 could present this receipt to the customs/border personnel 110, who could use a code or other information on the receipt to direct the traveler 108 to a baggage claim area, an egress area, or a secondary processing area 116. The traveler 108 could also present the receipt to the customs/border personnel 112 controlling exit from the overall customs/border enforcement area. In some embodiments, if the traveler 108 is cleared to proceed through the customs/border enforcement area, the kiosk 118 could print a second receipt or document that is provided to the traveler 108. The second receipt could be used for entry to a prioritized screening at a security checkpoint, such as a Transportation Security Administration (TSA) PreCheck line.

In some embodiments, various customs/border personnel 110-112 could carry or otherwise use various devices 120a-120b (such as portable MRZ/RFID/QR/other scanners or tablet/laptop/desktop/other computers with scanning/imaging capabilities) to scan travelers' passports, portable devices 124, or both as the travelers 108 move. For example, a QR code or other graphical indicator confirming the traveler's complete, validated travel information could be generated and displayed on the traveler's portable device 124 based on the information collected by the portable device 124 or at the kiosk 118. The devices 120a-120b could also retrieve the travelers' information and provide the customs/border personnel 110-112 with indications whether the travelers 108 are allowed to proceed or need to go through secondary processing. In these embodiments, the kiosk 118 need not provide printed receipts to the travelers 108, making this effectively a "paperless" process.

In some embodiments, the kiosk 118, the portable device 124, or both include a camera that captures one or more images of a traveler 108. As the traveler 108 moves between areas in the customs/border enforcement area, one or more cameras 122a-122b capture images of the traveler 108. Alternatively, the customs/border personnel 110-112 could use the devices 120a-120b to capture images of the traveler 108 as the traveler 108 approaches the personnel. Facial recognition could be used to identify the traveler 108 and display that traveler's information on the appropriate devices 120a-120b as the traveler 108 approaches or after the traveler 108 has arrived at particular locations. Again, in these embodiments, the kiosk 118 need not provide printed receipts to travelers 108, making this effectively a "paperless" process. Moreover, travelers 108 may not need to use their passports again after leaving the kiosk 118 or entering information into their portable devices 124.

Also note that the kiosk 118 and the portable device 124 could be used in various ways by different types of travelers 108. For example, in the United States, a kiosk 118 or a portable device 124 could provide information about U.S. citizens and legal permanent residents to a government agency, such as the U.S. Customs and Border Protection (CBP) agency. The kiosk 118 or portable device 124 could then receive indications whether travelers are allowed to proceed to egress points or need to undergo secondary processing. That information can be provided to personnel 110-112 via printed receipts, electronic notifications, or other mechanisms. However, other travelers may be required to undergo secondary processing at all times, and the kiosk 118 (but not the portable device 124) could collect information from those travelers and provide that information to personnel in the secondary processing areas 116. That information may or may not be provided to CBP or other government agency since there is no need to obtain an indication whether those travelers require secondary processing.

Additional details regarding example systems that support compliance with customs/border requirements are provided below. Additional details regarding example kiosks that support compliance with customs/border requirements are also provided below Although FIG. 1 illustrates one example of a customs/border enforcement scheme 100 at an airport or other location, various changes may be made to FIG. 1. For example, airports, train depots, bus depots, and other locations vary widely in size, scope, and layout. The scheme shown in FIG. 1 illustrates one possible way in which kiosks, portable devices, and other technology can be used to help simplify and speed up the customs/border enforcement processes.

FIGS. 2 through 7 illustrate example systems supporting compliance with customs/border requirements and related details according to this disclosure. In the following description, it is assumed that each system is used by arriving travelers attempting to enter a particular country via one or more airports. However, each system could be used in any other suitable location(s) and by any other suitable travelers.

Figure 2:
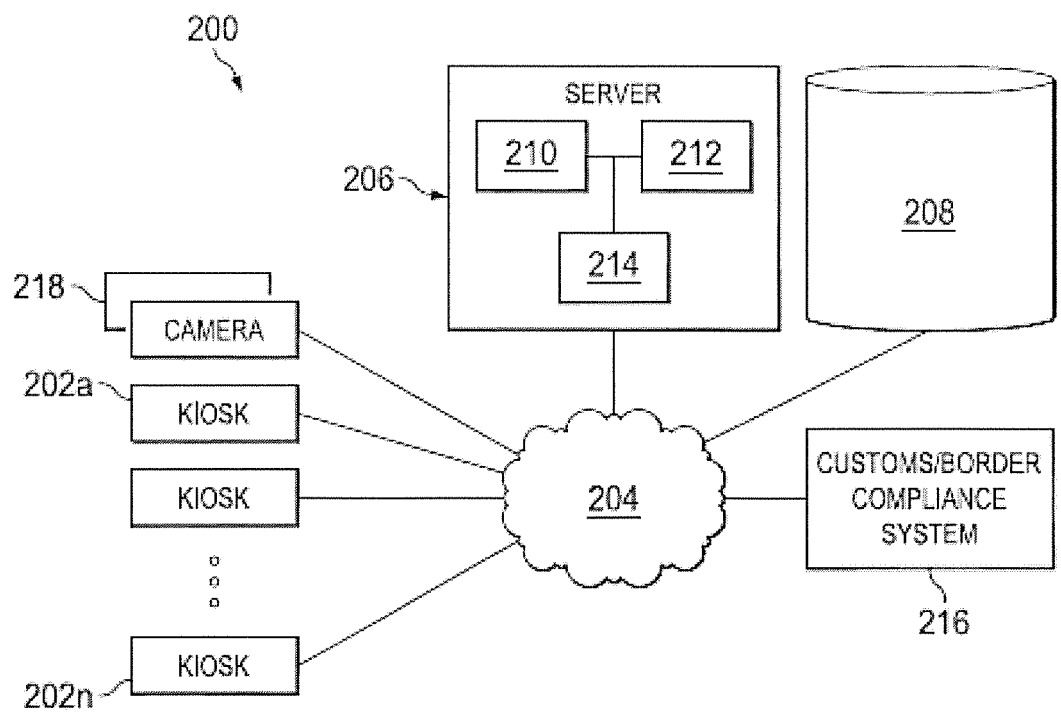
FIGS. 2 through 7 illustrate example systems supporting compliance with customs/border requirements and related details according to this disclosure.

As shown in FIG. 2, a system 200 includes multiple kiosks 202a-202n. The kiosks 202a-202n represent electronic systems that can be used by travelers wishing to pass through a customs/border checkpoint. As noted above, each kiosk 202a-202n can be used to scan travelers' passports and collect or verify information about the travelers. Each kiosk 202a-202n can also be used to collect desired or required customs/border declarations from the travelers. Each kiosk 202a-202n can further be used to capture each traveler's image and associate the image with that traveler's other data. In addition, each kiosk 202a-202n can optionally print receipts or other documents that can be provided by the travelers to customs/border enforcement officers or other travel security officers, such as a TSA officer at a TSA PreCheck line. Additionally or alternatively, each kiosk 202a-202n can provide the data directly to customs/border enforcement officers or other travel security officers. Each kiosk 202a-202n includes any suitable structure for interacting with and collecting data from travelers. One example embodiment of the kiosks 202a-202n is described below.

The kiosks 202a-202n communicate over at least one network 204. Each network 204 facilitates communication between various components coupled to the network. For example, a network 204 may communicate Internet Protocol (IP) packets, frame relay frames, Asynchronous Transfer Mode (ATM) cells, or other suitable information between network addresses. The network(s) 204 may include one or more local area networks, metropolitan area networks, wide area networks, all or a portion of a global network, or any other communication system(s) at one or more locations.

At least one server 206 and at least one database 208 are used in the system 200 to support data collection for customs/border enforcement. For example, the database 208 can be used to store information collected by the kiosks 202a-202n. The server 206 can receive the information from the kiosks 202a-202n, store the information in the database 208, and optionally make the information available to external devices or systems (such as to CBP or other government agencies). The server 206 and the database 208 could also facilitate other activities, such as providing customs/border-related or non-customs/border-related information to travelers via the kiosks 202a-202n.

The server 206 includes any suitable computing device(s) supporting traveler data collection. In this example, the server 206 includes at least one processing device 210, such as at least one microprocessor, microcontroller, digital signal processor, field programmable gate array, application specific integrated circuit, discrete circuitry, or other processing or control device(s). The server 206 also includes at least one memory 212 for storing and facilitating retrieval of instructions and information used, generated, or collected by the processing device(s) 210. The server 206 further includes at least one network interface 214 configured to support communications over at least one network, such as a wired network interface (like an Ethernet interface) or a wireless network interface (like a radio frequency transceiver). Note that multiple servers 206 could be used to provide various functionality in the system 200. For instance, one or more application servers can be used to execute applications for traveler data collection, and one or more database servers can be used to control access to the database 208. The database 208 includes any suitable device(s) for storing and facilitating retrieval of information.

The system 200 could further include or interact with at least one customs/border compliance system 216. The customs/border compliance system 216 represents a system used by customs/border enforcement officers or other government officials or agencies. The customs/border compliance system 216 can receive the data collected or generated by the kiosks 202a-202n and/or the server 206, such as information identifying travelers and their related details. This data could be received directly or indirectly, such as via the database 208. The customs/border compliance system 216 can use this information in any suitable manner. For instance, the customs/border compliance system 216 could flag any traveler who provided or failed to provide certain declarations. The customs/border compliance system 216 could also perform image matching to verify that a traveler's recently-captured image or biometric data matches a preexisting picture or expected biometric data of the traveler. The customs/border compliance system 216 could further search alias, criminal, or terrorist databases with the traveler's name, image, or biometric data to determine if a match is found. The customs/border compliance system 216 could perform any other or additional functions as desired using information from the kiosks 202a-202n and/or server 206. In some embodiments, the customs/border compliance system 216 could be protected from unauthorized access, such as using a firewall. Also, communications to and from the compliance system 216 could occur using any suitable protocol(s), such as Simple Object Access Protocol (SOAP) or Hypertext Transfer Protocol Secure (HTTPS).

In some embodiments, the customs/border compliance system 216 could be responsible for deciding whether travelers are free to pass or require detention or secondary processing. Information from the kiosks 202a-202n about various travelers could be provided directly or indirectly to the customs/border compliance system 216, and the customs/border compliance system 216 can determine the disposition of the various travelers. Information identifying the decisions made by the customs/border compliance system 216 can be provided to the kiosks 202a-202n or to customs/border personnel (such as via the devices 120a-120b) for use in deciding how to handle the various travelers.

As noted above, however, interactions between the kiosks 202a-202n and the customs/border compliance system 216 need not occur in some situations. For example, the kiosks 202a-202n could be used to collect information from travelers who require secondary processing, and the kiosks 202a-202n could pass along the collected information to customs/border personnel without forwarding that information to or without waiting for decisions from the customs/border compliance system 216. As another example, the kiosks 202a-202n could detect questionable or fraudulent travel documents (such as fake or modified passports) and immediately alert customs/border personnel without transmitting information to the customs/border compliance system 216 or without waiting for a decision whether secondary processing is needed.

Various cameras 218 could also be used in the system 200 to facilitate functions such as security monitoring and facial recognition. As noted above, facial recognition can be used to identify travelers as the travelers move into different areas of a customs/border enforcement area. As a specific example, facial recognition can be used to identify a traveler and pull up that traveler's information on a display screen used by customs/border enforcement personnel without the need to rescan the traveler's passport.

Note that communications between various components (such as kiosks 202a-202n and the server 206 or compliance system 216) could occur using one or more secure communication protocols. For example, in particular embodiments, two components that are to communicate with one another can engage in two-way Secure Socket Layer (SSL) authentication.

Figure 3:
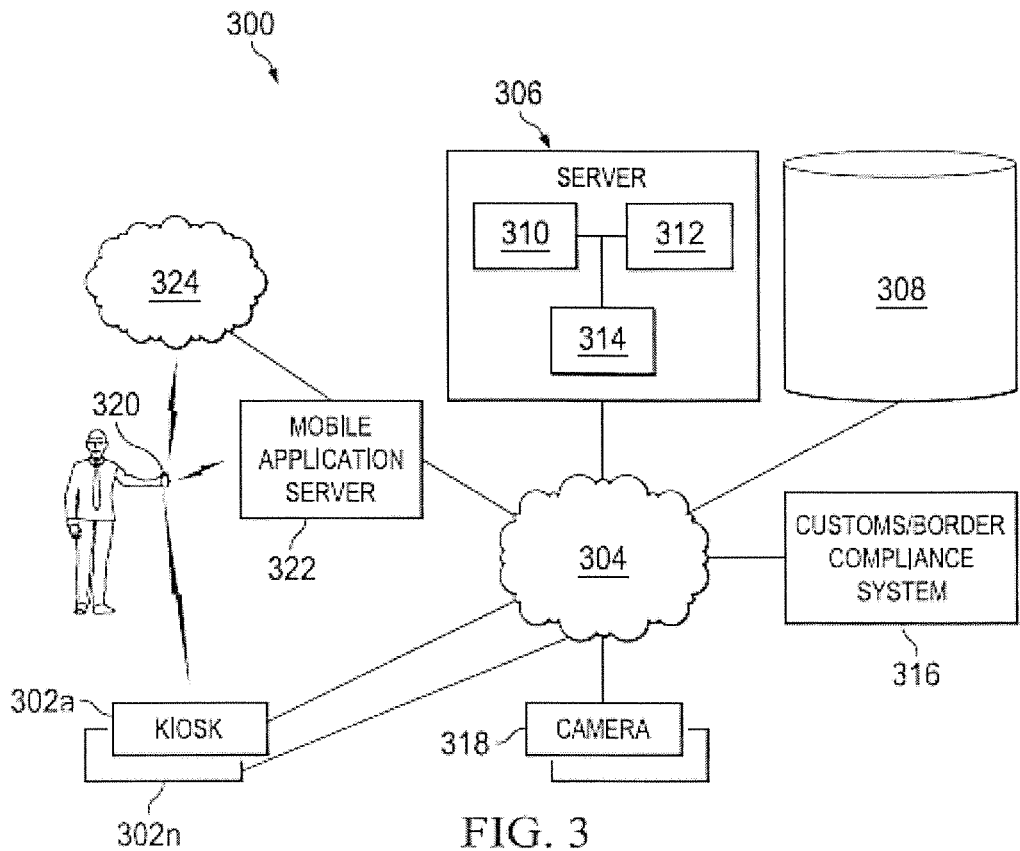

As shown in FIG. 3, a system 300 includes kiosks 302a-302n, at least one network 304, at least one server 306, and at least one database 308. The server 306 includes at least one processing device 310, at least one memory 312, and at least one network interface 314. The system 300 also includes at least one customs/border compliance system 316 and cameras 318. These components may be the same as or similar to corresponding components in FIG. 2.

Each kiosk 302a-302n in this example could interact with a traveler as described above. However, in this embodiment, a traveler's mobile device 320 can also be used to provide information to the system 300. The mobile device 320 represents any suitable portable computing device, such as a mobile telephone, smartphone, personal digital assistant, laptop computer, wrist computer, or tablet computer. The mobile device 320 could execute an "app" or other application that collects various information from the traveler, or the mobile device 320 could allow a traveler to access a website or other computing resource and provide information about the traveler for collection at a remote site.

The collected information could include information about the traveler, such as his or her name, address, and passport information. The collected information could also include travel information for the traveler, such as his or her flight information. The collected information could further include the traveler's answers for customs/border declarations. In addition, if the mobile device 320 is equipped with a camera or biometric data collector, the collected information could include a photograph or biometric data of the traveler. For instance, some portable devices allow for the collection of one or more fingerprints from a user. This capability could be used to collect one or more fingerprint scans of a traveler.

The data collected using a mobile device 320 can be used in any suitable manner. In some embodiments, the data could remain stored on a mobile device 320 and then transmitted directly to a kiosk 302a-302n, such as when a traveler approaches the kiosk. This could be done, for instance, via infrared or WiFi communications between the mobile device 320 and the kiosk 302a-302n. This could also be done by pairing the mobile device 320 and the kiosk 302a-302n, such as via a BLUETOOTH connection. As particular examples, an app on the mobile device 320 could access wireless security credentials used for secure wireless communications with a kiosk. Alternatively, a display of the kiosk 302a-302n could present an alphanumeric code, QR code, or other code that can be manually entered into or scanned by the mobile device 320 to pair the devices or transfer information to the mobile device 320. The reverse of this could also occur. That is, a display of the mobile device 320 could present an alphanumeric code, QR code, or other code that can be manually entered into or scanned by the kiosk 302a-302n to pair the devices or transfer information to the kiosk 302a-302n. Any other or additional mechanism (s) can be used to support data transfer directly between a mobile device 320 and a kiosk 302a-302n.

Data can also be transferred indirectly between the mobile device 320 and a kiosk. For example, the mobile device 320 could communicate with a mobile application server 322. These communications could occur directly or indirectly, such as via the network 304 or a third-party network 324 (like a cellular or other mobile telephone or data network). The mobile application server 322 can receive data from the mobile device 320, such as from an app executed by the mobile device 320. The mobile application server 322 can then provide the data to a kiosk being used by a traveler, to the server 306, and/or to the customs/border compliance system 316.

Note that in other implementations, a traveler using a mobile device 320 may be able to skip interacting with a kiosk 302a-302n completely, and no data may be sent from the mobile device 320 to a kiosk (directly or indirectly). For example, the traveler could provide all requested data, make all requested declarations, take a photograph of himself or herself, and take a photograph or otherwise scan his or her passport. The mobile device 320 could then make all of this information available to other components of the system 300, such as the server 306. In still other embodiments, a traveler using the mobile device 320 may be required to interact with a kiosk 302a-302n, such as to take a photograph or scan his or her passport. However, the traveler's time interacting with the kiosk can be significantly reduced when the traveler provides data via the mobile device 320 prior to approaching a kiosk.

Figure 4:
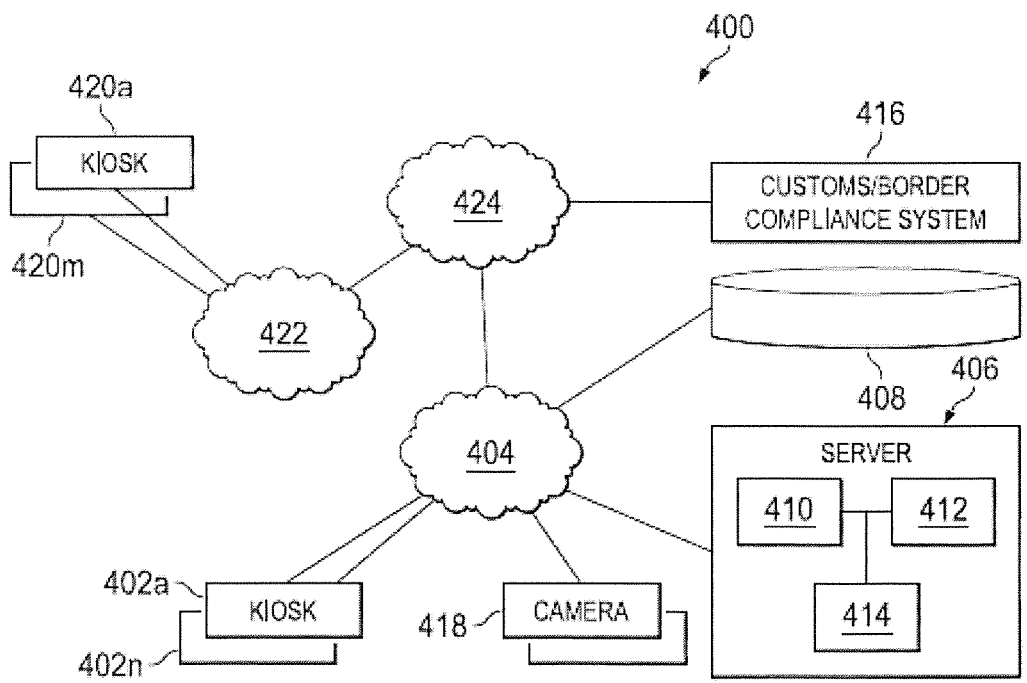

As shown in FIG. 4, a system 400 includes kiosks 402a-402n, at least one network 404, at least one server 406, and at least one database 408. The server 406 includes at least one processing device 410, at least one memory 412, and at least one network interface 414. The system 400 also includes at least one customs/border compliance system 416 and cameras 418. These components may be the same as or similar to corresponding components in FIGS. 2 and 3. The components 402-414, 418 could be used in a first location, such as a first airport.

The system 400 also includes multiple additional kiosks 420a-420m coupled to another network 422. The kiosks 420a-420m could be the same as or similar to the kiosks 402a-402n, and the network 422 represents any suitable network facilitating communications with the kiosks 420a-420m. The kiosks 420a-420m and the network 422 could be used in a second location, such as a distant part of the first airport or at a second airport (possibly separated from the first airport by a large distance). As a particular example, the kiosks 420a-420m could be disposed at, or otherwise associated with, a security checkpoint such as a TSA PreCheck line. The networks 404 and 422 could communicate via a third network 424, which represents any suitable network or combination of networks. As a particular example, the third network 424 could represent a secure network, such as a cloud-based network compliant with suitable Federal Information Processing Standards (FIPS) requirements.

In this example, the server 406 handles (i) interactions between the kiosks 402a-402n and the customs/border compliance system 416 and (ii) interactions between the kiosks 420a-420m and the customs/border compliance system 416. The server 406 can be said to "host" the kiosks 420a-420m since the kiosks 420a-420m lack their own server or other gateway to a customs/border compliance system 416. The kiosks 420a-420m cannot interact directly with the customs/border compliance system 416 and instead access the compliance system 416 via the server 406. In this particular example, the customs/border compliance system 416 is coupled to the third network 424, although this need not be the case.

Figure 5:
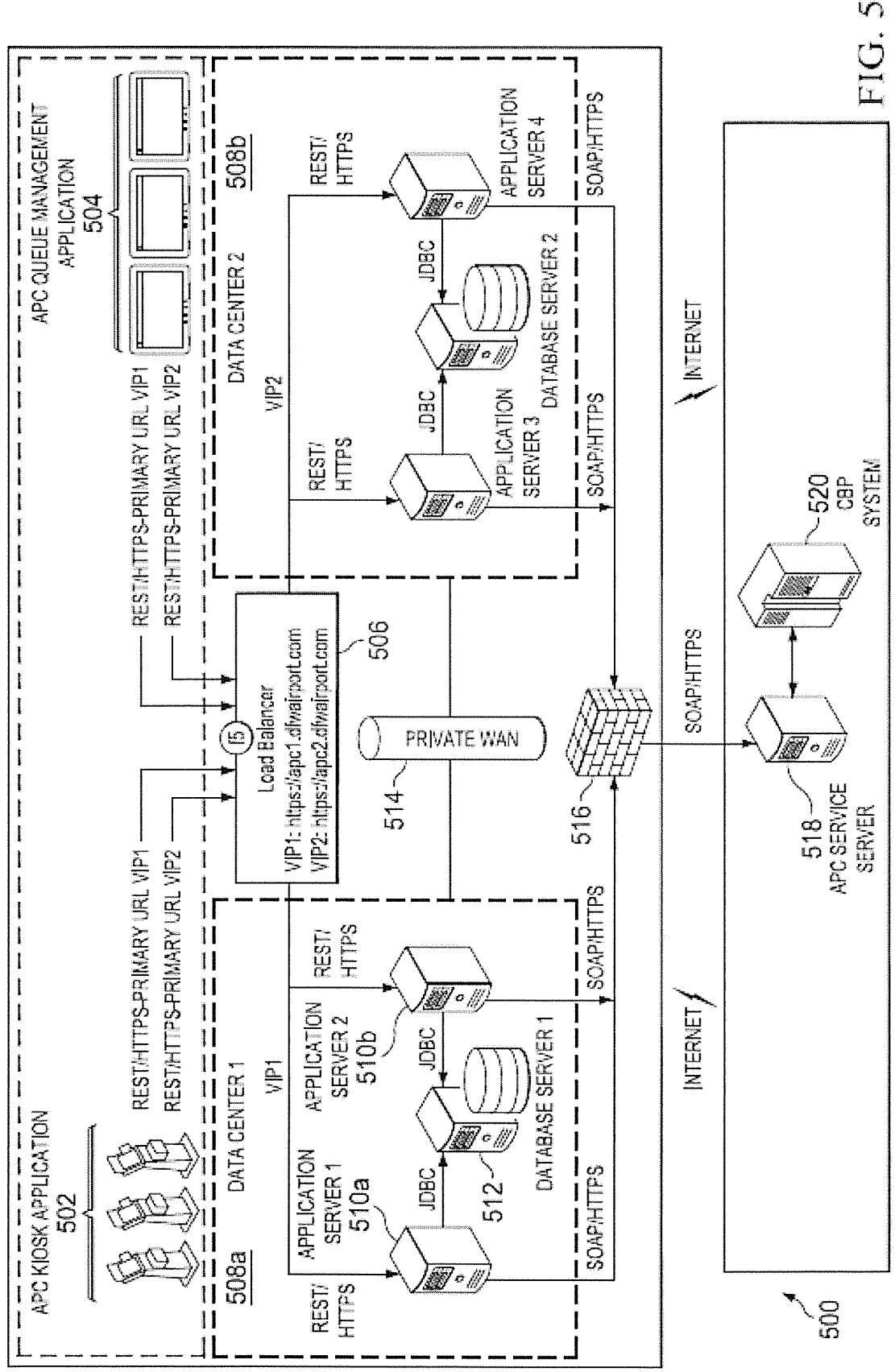

FIG. 5 illustrates a specific example implementation of a system 500 that supports customs/border enforcement. As shown in FIG. 5, the system 500 includes multiple kiosks 502, which could be located at one or more airport terminals or other locations. The kiosks 502 support automated passport control (APC). The system 500 also includes one or more APC queue managers 504, which denote laptop computers, tablet computers, display screens, or other devices used by customs/border enforcement personnel. For instance, information about travelers can be displayed on the queue managers 504 to facilitate disposition of the travelers.

These components 502-504 communicate with at least one load balancer 506, which distributes workload associated with the kiosks 502 and managers 504 amongst multiple data centers 508a-508b. Each data center 508a-508b includes multiple application servers 510a-510b, which could support operations such as traveler information collection and facial recognition. Each data center 508a-508b also includes at least one database server 512 that facilitates storage and retrieval of information.

At least one network 514 can be used to support communications amongst various components within the system 500. The network 514 could represent any suitable network, such as a private WAN. At least one firewall 516 controls access to the network 514, such as by requiring authentication before a user is allowed to access the network 514. Any suitable protocol(s) can be used to support communications amongst various components within the system 500. For instance, the kiosks 502 and managers 504 could communicate using Representational State Transfer (REST)/HTTPS, and the servers 510a-510b could communicate using SOAP/HTTPS. The servers 510a-510b, 512 could also communicate using JAVA Database Connectivity (JDBC).

Customs/border enforcement information is exchanged between the data centers 508a-508b and at least one APC service server 518, which provides access to at least one government agency's computer system (in this case, a CBP system 520). The APC service server 518 can perform various functions, such as authenticating the data centers 508a-508b, providing information to the CBP system 520 in a suitable format, and retrieving information from the CBP system 520 for delivery to the data centers 508a-508b.

Figure 6:
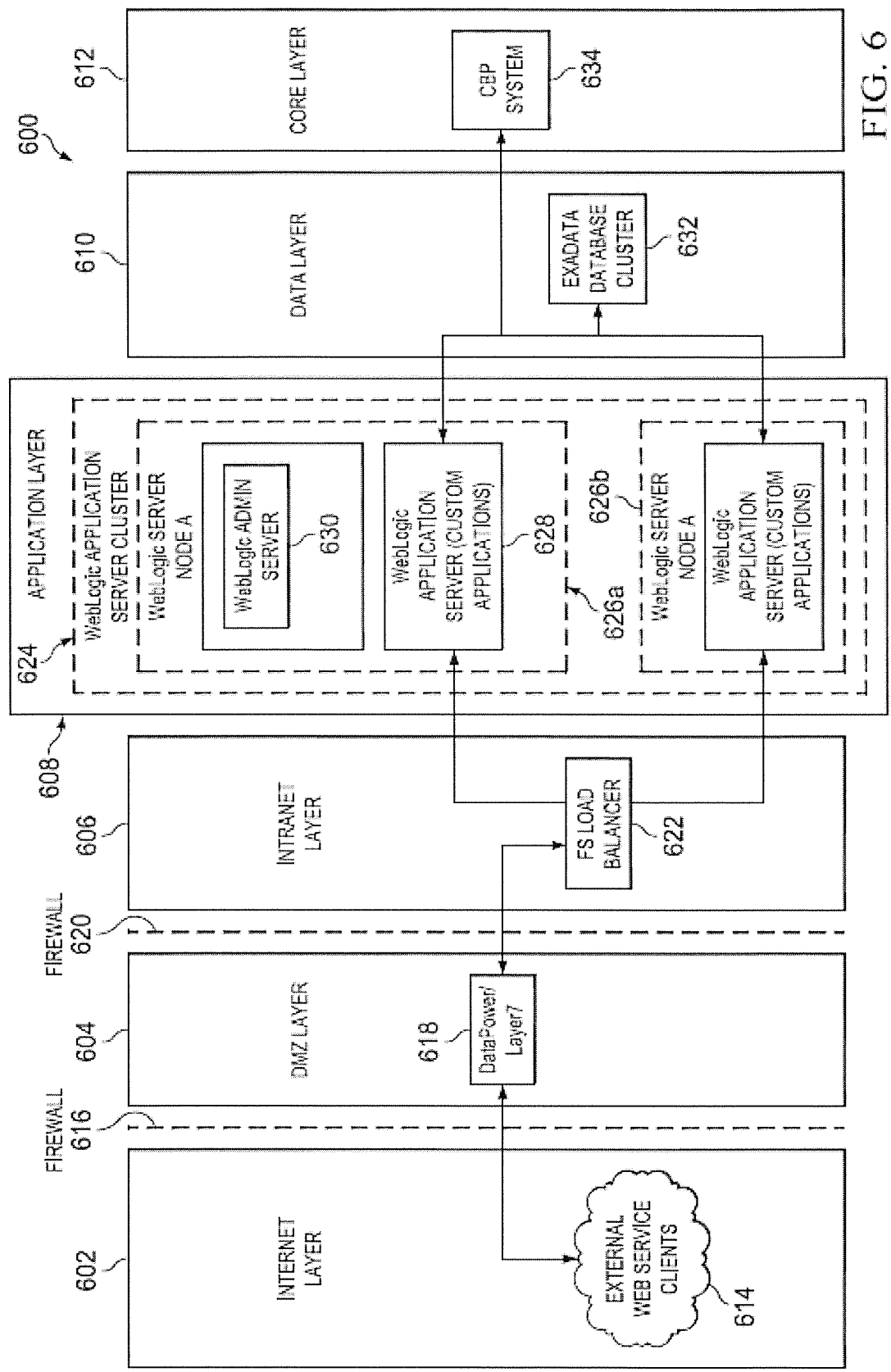

FIG. 6 illustrates an example technical architecture of a system 600 supporting compliance with customs/border requirements. In particular, FIG. 6 illustrates one possible example of isolating and mitigating security risks associated with attaching a non-government controlled system to a government network (such as a CBP network).

As shown in FIG. 6, the architecture here is generally divided into six layers 602-612. An Internet layer 602 generally denotes the layer in which various web service clients 614 (such as multiple kiosks) are hosted. A firewall 616 separates the Internet layer 602 from a demilitarized zone (DMZ) layer 604. The interface protocol between the Internet layer 602 and the DMZ 604 can be HTTPS/SOAP/XML messages sent to and from an XML appliance 618, such as a LAYER7 gateway. The XML appliance 618 can provide kiosks with a basic service access point to an APC service. The XML appliance 618 can be configured to prevent and control unauthorized access to servers and other services not available to systems outside the CBP network. Another firewall 620 separates the DMZ layer 604 from an Intranet layer 606, which includes a load balancer 622.

An application layer 608 can be implemented using at least one application server cluster 624, which is where the APC service can also reside. The APC service processes requests from kiosks and provides responses to the kiosks. The APC service also generates and processes CBP or other system messages and enforces business rules associated with an expedited CBP inspection. The APC service further ensures that message and dialogue timing requirements are met. The server cluster 624 here includes multiple application server nodes 626a-626b, each of which supports at least one application server 628 that executes one or more APC service applications. At least one administration server 630 can be used to control or oversee the entire application layer 608. A data layer 610 includes at least one database 632 that is accessible by the server cluster 624 and an external system 634 in a core layer 612. The external system 634 could represent a CBP or other government system.

Figure 7:
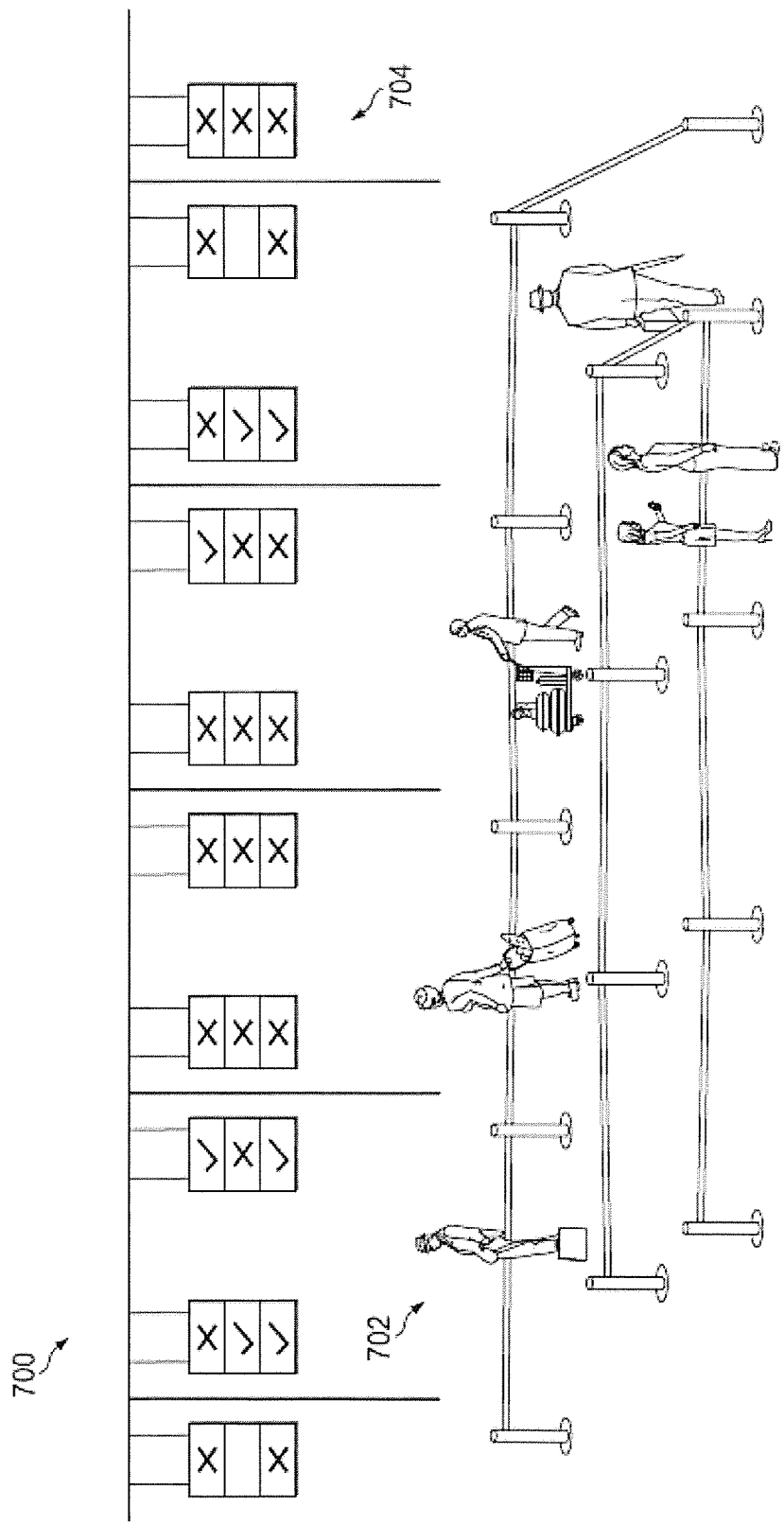

FIG. 7 illustrates an example system 700 in which travelers wait in one or more queues 702 to use various kiosks. Here, the kiosks are placed in groups of three, and each group of kiosks has an associated status display 704. Each status display 704 identifies the status of the three kiosks in its associated group. For example, a green display with a checkmark could indicate that a kiosk is operational and not currently in use by a traveler. A black display with an X could indicate that a kiosk is operational and currently in use by another traveler. A black display with a red horizontal line could indicate that a kiosk is not operational. Note, however, that any other suitable arrangement of kiosks and any suitable indicators identifying the statuses of the kiosks (or no status displays) could be used. As an example of an additional feature, each kiosk in a group could be identified with a label, such as a letter (like "A" through "C" or "D" through "F") or other alphanumeric identifier, and the status displays 704 could use the alphanumeric identifiers to identify the statuses of the kiosks.

Although FIGS. 2 through 7 illustrate examples of systems supporting compliance with customs/border requirements and related details, various changes may be made to FIGS. 2 through 7. For example, each system could include any number of each component. Also, FIGS. 2 through 7 illustrate various examples of the types of systems that can be used to support compliance with customs/border requirements. However, data collection and processing systems are highly flexible and reconfigurable, and this disclosure is not limited to the specific configurations shown here. In addition, the functional divisions shown in FIGS. 2 through 7 are for illustration only. Various components in each figure could be combined, further subdivided, or omitted and additional components could be added according to particular needs. Moreover, any combination of components shown in these figures could be used.

Figure 8:
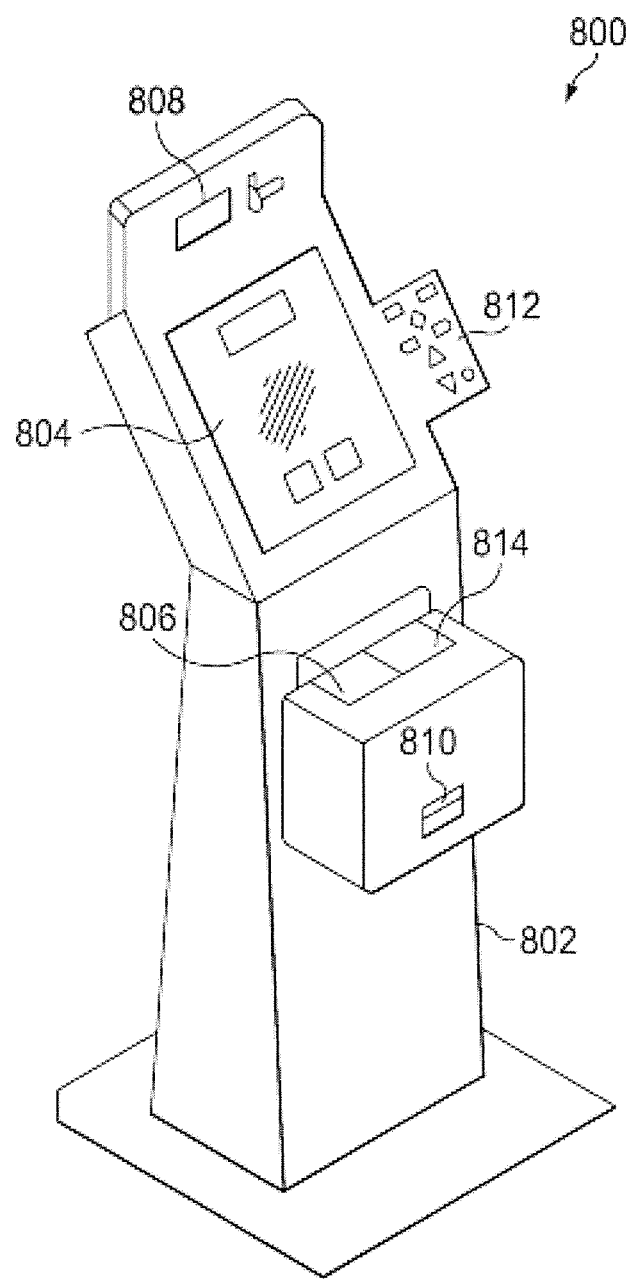
FIGS. 8 through 10 illustrate example kiosks and portable devices supporting compliance with customs/border requirements according to this disclosure.
Figure 9:
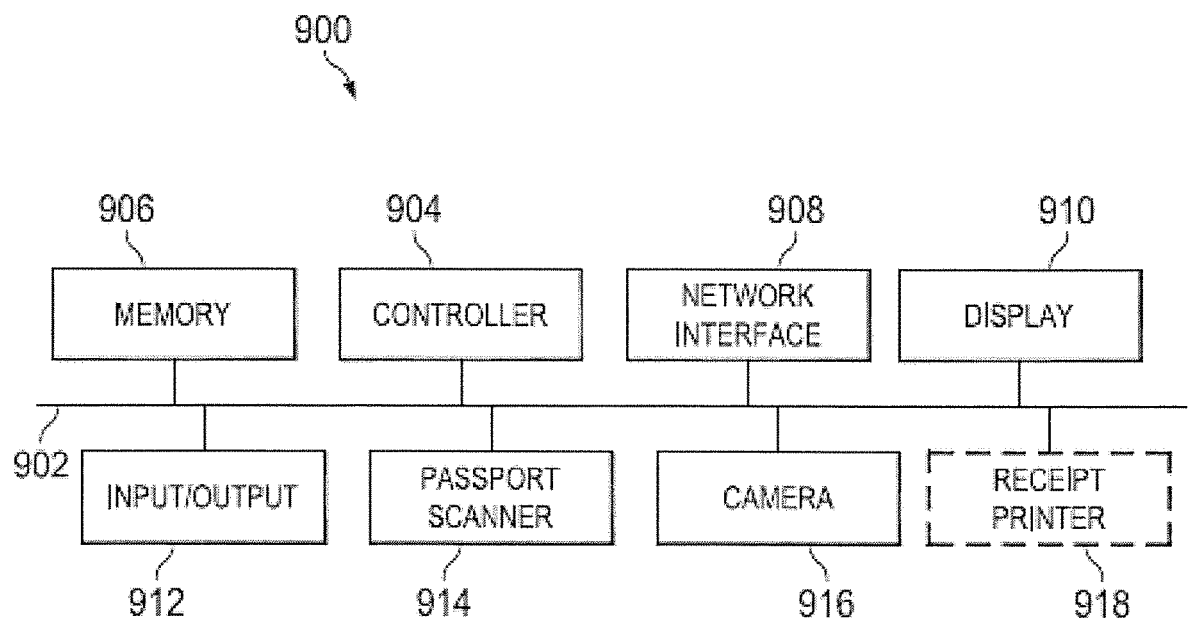
Figure 10:
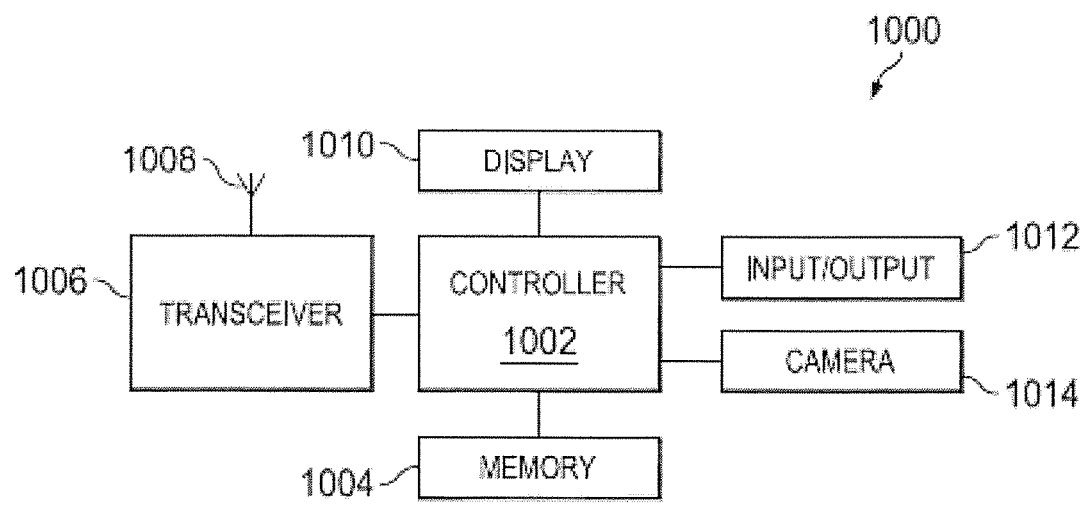

FIGS. 8 through 10 illustrate example kiosks and portable devices supporting compliance with customs/border requirements according to this disclosure. In particular, FIG. 8 illustrates an example form factor for a kiosk, FIG. 9 illustrates example components of a kiosk, and FIG. 10 illustrates example components of a portable device. The portable device could represent a mobile device used by a traveler to submit information for customs/border enforcement purposes. The portable device could also represent a device used by customs/border enforcement personnel, such as to review information about travelers. The kiosks and portable devices could be used in any of the systems described above.

As shown in FIG. 8, a kiosk 800 includes a housing 802, which generally denotes any suitable structure that contains or carries other components of the kiosk 800. The housing 802 could have any suitable size, shape, and dimensions and be formed from any suitable material(s) (such as metal). A display screen 804 is mounted in or to the housing 802 and is used to provide information to travelers. For instance, the display screen 804 could present a welcome screen to a traveler, give instructions to the traveler, and display questions to the traveler. If implemented as a touchscreen, the display screen 804 could also receive input from the traveler, such as an identification of how many people are in the traveler's group and answers to any displayed questions.

A slot 806 denotes an area where travelers can insert their passports (or portions of their passports) or other travel documents for scanning by the kiosk 800. A window 808 allows at least one camera within the kiosk 800 to capture images of travelers. A slot 810 denotes an area where documents (such as printed receipts) may optionally be provided to travelers. An area 812 of the kiosk 800 denotes space where a keypad or keyboard could be installed. The keypad or keyboard could support any suitable functions and support compliance with various regulations, such as the Americans with Disabilities Act. Note that the positioning of the area 812 in FIG. 8 is for illustration only and that the keypad or keyboard could be located elsewhere. An additional scanner 814 could be used for various purposes, such as to scan travelers' fingerprints or perform other functions.

The display screen 804 can be used to present a graphical user interface to travelers. The graphical user interface could be used to interact with, collect information from, and provide information to travelers. For example, the graphical user interface could initially display a welcome screen and allow a traveler to select a language (a kiosk could support any number of languages). The welcome screen can also show part of a disclaimer, and a user could use navigation buttons or touch inputs to review the disclaimer. The disclaimer could, for instance, identify who can use the kiosk and indicate that information must be accurate and will be transmitted to a government agency for review.

Once a language is selected, a traveler can indicate whether he or she is traveling alone or with a family. If the traveler indicates he or she is traveling alone, the graphical user interface prompts the traveler to scan his or her passport. Once scanned, the graphical user interface displays information based on the scanned passport (such as name, date of birth, gender, passport issuing country, and passport expiration date) and asks the traveler to take his or her picture. The traveler can position himself or herself in front of the kiosk's camera and depress a "Take Photo" button. Once a photograph of the traveler is captured, the graphical user interface presents the captured photograph and the information retrieved from the traveler's passport. If the traveler indicates that the information is not correct, the traveler can be prompted to rescan his or her passport. If the traveler indicates that the information is correct, the graphical user interface asks the traveler various questions related to common customs/border declarations. Once the traveler answers all questions, the traveler is asked to confirm the declarations answers. If the traveler confirms the declarations answers, the traveler is asked to confirm his or her travel information (such as departure city, arrival city, and flight number). The flight information could be retrieved from an airline database or in any other suitable manner. If the traveler indicates that the travel information is not correct, the traveler can select an airline and a flight. After the traveler indicates that the travel information is correct or after the traveler has selected an airline and flight, a receipt can optionally be printed for the traveler, and the traveler is directed to a customs/border enforcement officer.

If the traveler indicates that he or she is traveling with a family, the graphical user interface asks the traveler to identify how many people are in the traveler's family. Assume for this example the traveler indicates that three people are traveling in a family. The first traveler is prompted to scan his or her passport, take a photograph, and confirm the first traveler's information. Once confirmed, the second traveler is prompted to scan his or her passport and confirm the second traveler's information. Once confirmed, the third traveler is prompted to scan his or her passport, take a photograph, and confirm the third traveler's information. In some embodiments, if the traveler is a child, a photograph may not be required during this process. The travelers are then given the option to confirm that no other family members are traveling in the group. Once all travelers have been processed, declaration questions are presented to the travelers, and answers to the questions are received and confirmed. The travelers' flight information is also confirmed. Finally, the receipts for multiple travelers can optionally be printed, and the travelers can be directed to a customs/border enforcement officer.

If at any time a traveler cancels his or her session on a kiosk, a termination screen can be presented to the traveler. If a traveler is unable to properly scan his or her passport, the traveler can be directed to a specific location on a map. The map can be customized for a particular airport or other location.

Note that all or a subset of these screens could be presented to a traveler using a mobile device. For example, the mobile device could be used to indicate whether a traveler is traveling alone or with a family, scan the passport (s) of the traveler(s), take a photograph of each traveler, obtain answers to declaration questions, and confirm flight information (or any subset of these functions). The display screen on a kiosk could then be modified to skip certain screens, such as skipping steps asking for the same information once the information from the mobile device has been obtained. In some embodiments, if the mobile device is able to collect all needed traveler information, interaction with a kiosk may not be needed. Also note that the graphical user interface described above is for illustration only, and a wide variety of changes to both the content and layout of the graphical user interface could be made.

As shown in FIG. 9, a kiosk 900 includes at least one bus system 902, which supports communication between other components of the kiosk 900. The bus system 902 includes any suitable communication links. At least one processing device 904 executes instructions that may be loaded into at least one memory 906. The processing device 904 may include any suitable number(s) and type(s) of processors or other devices in any suitable arrangement. Example types of processing devices 904 include microprocessors, microcontrollers, digital signal processors, field programmable gate arrays, application specific integrated circuits, discrete circuitry, or other processing or control device(s). The memory 906 includes any structure(s) capable of storing and facilitating retrieval of information (such as data, program code, and/or other suitable information on a temporary or permanent basis). The memory 906 could include random access memory, read only memory, Flash memory, a hard drive, an optical disc, or any other or additional volatile or non-volatile storage device(s).

At least one network interface 908 supports communications between the kiosk 900 and other systems or devices. For example, the network interface 908 could include a network interface card or a wireless transceiver. The network interface 908 may support communications through any suitable physical or wireless communication link(s).

A display 910 and at least one input/output unit 912 facilitate interaction with a traveler. For example, the display 910 could present information collected from a traveler or other source(s) for confirmation or questions being asked to the traveler. The display 910 (if implemented as a touchscreen) or the input/output unit 912 (such as a keyboard or keypad) could also receive inputs from a traveler, such as answers to questions displayed to the traveler. The display 910 represents any suitable display device, such as a liquid crystal display (LCD) or light emitting diode (LED) display device. Each input/output unit 912 represents any suitable structure for receiving user input or providing user output.

The kiosk 900 further includes a passport scanner 914 and a camera 916. The passport scanner 914 represents a device that can optically or otherwise scan a traveler's passport to read a barcode, QR code, text, or other information on the traveler's passport. Any suitable mechanism can be used to scan a passport, such as a laser scanner or a camera. The passport scanner 914 could also use RFID signals from passports to retrieve information from the passports. In addition, some passport scanners are capable of detecting modified or fraudulent passports, such as by verifying holographic images or detecting a passport photograph placed on top of an original passport photograph.

The camera 916 is used to capture an image of a traveler. For example, during the data collection process, the kiosk 900 (via the display 910) can inform a traveler that he or she needs to take a photograph, such as for inclusion on a receipt to be printed for the traveler or for other purposes. The camera 916 can display a live image on the display 910 so that the traveler can position himself or herself appropriately, and the display 910 or input/output unit 912 can be used to trigger an image capture by the camera 916. The camera 916 represents any suitable image capture device, such as a digital camera.

A printer 918 could optionally be used to print receipts or other documentation for travelers. For example, once the desired information, declarations, and image of a traveler have been obtained, this information could be printed on a receipt or other document using the printer 918. The receipt or other document could then be taken by the traveler to a customs/border enforcement officer. This can greatly simplify the customs/border process and allow faster passage through a customs/border checkpoint. In some embodiments, a second receipt or other document could be generated by the printer 918 and taken by the traveler for entry to a prioritized security checkpoint such as a TSA PreCheck line. This can greatly speed the security screening process for travelers that have already been cleared at the customs/border enforcement area. However, as noted above, the kiosk 900 could support a paperless process, which could simplify the customs/border process even further.

FIG. 10 illustrates an example mobile device 1000 that can be used by a traveler or by customs/border enforcement personnel. The mobile device 1000 could, for example, be used as the mobile devices 120*a*-120*b*, 124, 320 described above.

As shown in FIG. 10, the mobile device 1000 includes a controller 1002. The controller 1002 controls the overall operation of the mobile device 1000. For example, in a traveler's device, the controller 1002 can receive data associated with the traveler and provide the data to one or more other components in the mobile device 1000 for transmission. In a customs/border personnel's device, the controller 1002 can receive data associated with a traveler and present that information to the customs/border personnel for use in verifying a traveler's identify and assisting in final disposition of the traveler. Note that if only the customs/border personnel are viewing the mobile device 1000, confidential or other information that is not normally printed on a traveler's receipt could be displayed to the customs/border personnel. The controller 1002 could also perform other functions, such as handling incoming or outgoing telephone calls, text messages, web browsing, or other functions. The controller 1002 includes any suitable structure for controlling the operation of the mobile device 1000. As particular examples, the controller 1002 could represent at least one microprocessor, microcontroller, digital signal processor, field programmable gate array, application specific integrated circuit, discrete circuitry, or other processing or control device(s).

A memory 1004 is coupled to the controller 1002. The memory 1004 stores any of a wide variety of information used, collected, or generated by the mobile device 1000. For example, the memory 1004 could store traveler data to be transmitted to external components or data received from external components. The memory 1004 includes any suitable volatile and/or non-volatile storage and retrieval device(s).

The mobile device 1000 also includes one or more wireless transceivers 1006 coupled to one or more antennas 1008. The transceiver(s) 1006 and antenna(s) 1008 can be used by the mobile device 1000 to communicate wirelessly with other devices or systems. For example, the mobile device 1000 could use the transceiver(s) 1006 and antenna(s) 1008 to communicate over cellular telephone networks, WiFi networks, and BLUETOOTH connections. Each transceiver 1006 includes any suitable structure for generating signals to be transmitted wirelessly and/or receiving signals received wirelessly. In some embodiments, each transceiver 1006 represents an RF transceiver. Each transceiver 1006 could also include a transmitter and a separate receiver. In some embodiments, each antenna 1008 could represent an RF antenna (although any other suitable wireless signals could be used to communicate).

The mobile device 1000 further includes a display 1010 and at least one input/output unit 1012. The display 1010 can be used to provide information to a traveler or customs/border personnel and optionally receive input from the traveler or customs/border personnel (when implemented as a touchscreen). As a particular example, the display 1010 may be used to display a machine-readable barcode, QR code, or other suitable identifier of information. The input/output unit 1012 is used to provide information to or receive information from the traveler or customs/border personnel.

In addition, the mobile device 1000 could include a camera 1014. The camera 1014 could be used to capture images associated with a traveler. For example, in a traveler's device, the camera 1014 could be used to capture one or more images of the traveler or the traveler's passport. In a customs/border personnel's device, the camera 1014 could be used to capture images of travelers or travelers' passports for travelers who are interacting with the customs/border personnel. Note, however, that the use of a camera 1014 in the traveler's device may not be permitted or required, such as when security regulations or other requirements specify that a traveler's passport needs to be scanned or the traveler's photograph or biometric data needs to be captured at a kiosk.

The mobile device 1000 could provide any other suitable functionality as needed or desired. For example, the mobile device 1000 of a traveler could support a concierge service associated with an airport or other travel location. As a particular example, after a traveler has provided various customs-related information to an app and exited an aircraft, a concierge app on the mobile device 1000 could direct the traveler to a baggage pickup area or customs/border checkpoint. The concierge app could also inform the traveler of the current wait time at a customs/border checkpoint. If the wait time is excessive (such as longer than a user-defined or other threshold), the concierge app could provide the traveler with a list of options. For instance, the concierge app could identify nearby restaurants within an airport terminal that are accessible without going through a customs/border checkpoint. The concierge app could also determine whether the traveler has a reservation for vehicle transportation (such as a car service) and ask whether the reservation should be delayed until the traveler can clear the customs/border checkpoint. The concierge app could provide any other or additional functionality that could be useful to a traveler.

Although FIGS. 8 through 10 illustrate examples of kiosks and portable devices supporting compliance with customs/border requirements, various changes may be made to FIGS. 8 through 10. For example, the functional divisions shown in FIGS. 8 through 10 are for illustration only. Various components in each figure could be combined, further subdivided, or omitted and additional components could be added according to particular needs.

Figure 11A:
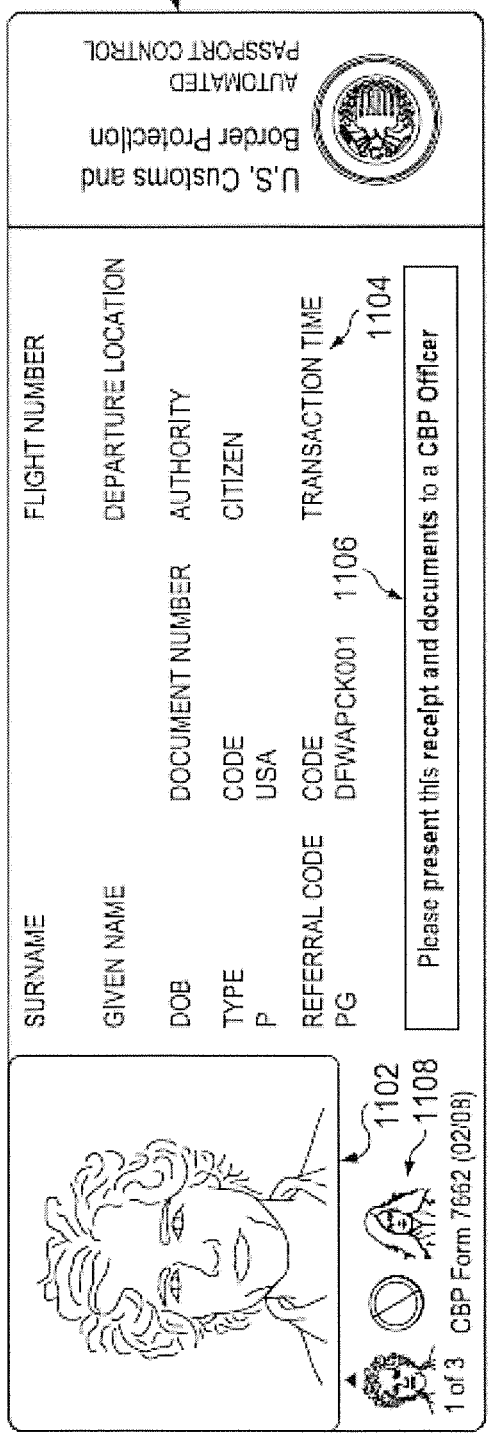
FIGS. 11A and 11B illustrate example printed receipts or graphical displays supporting compliance with customs/border requirements according to this disclosure.
Figure 11B:
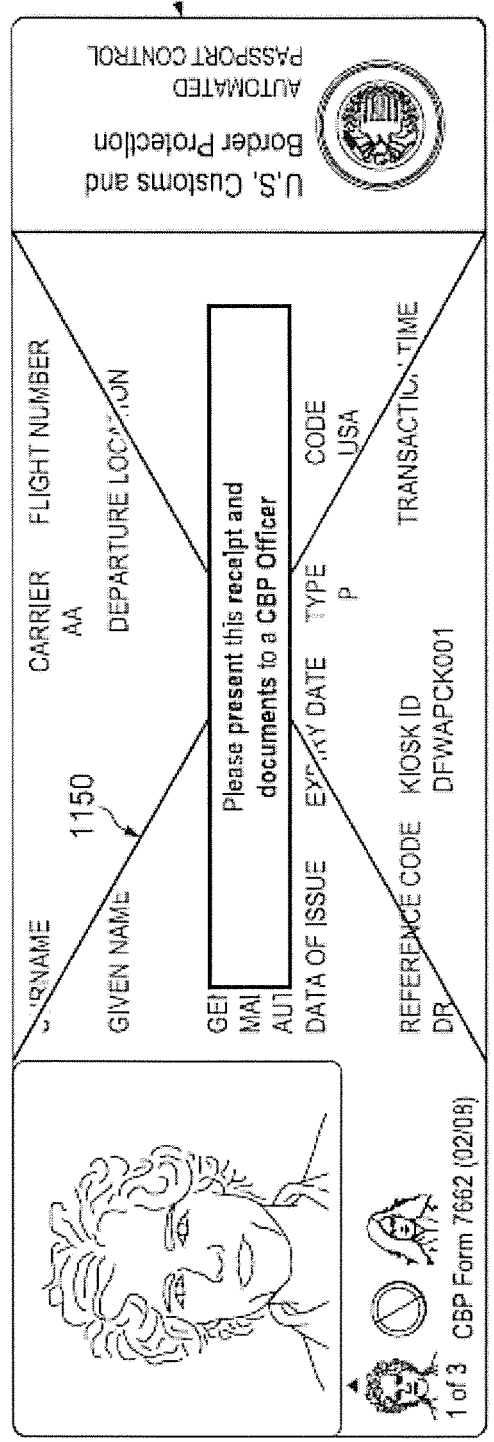

FIGS. 11A and 11B illustrate example printed receipts or graphical displays supporting compliance with customs/border requirements according to this disclosure. The printed receipts could be created by kiosks based on information provided to the kiosks by various travelers. The graphical displays could be presented on devices used by customs/border enforcement personnel when travelers have approached or are approaching the customs/border personnel. As noted above, the presentation of a graphical display could be automated based on, for example, a scan of a traveler's passport or facial recognition.

As shown in FIG. 11A, a receipt or graphical display 1100 includes a photograph 1102 of a traveler. The traveler could be a person traveling alone or one of the adults traveling in a family unit. Information 1104 about that traveler is also presented, and (if provided to a traveler) instructions 1106 are given as to how the traveler should proceed. If the traveler is part of a family unit, two or more thumbnail images 1108 can be provided that identify the people in the family unit. Actual images of children in a family unit could be omitted from the thumbnail images 1108 for security or privacy purposes.

In this example, the information 1104 about the traveler includes name, date of birth, flight information, and citizenship information. The information 1104 also includes a referral code, which informs customs/border enforcement personnel how to handle the traveler. Example referral codes could include:

Enforcement Referral (ER)—an individual is referred to secondary processing for any type of enforcement issue;

Random Referral (RR)—an individual is referred to secondary processing for random inspection;

Declaration Referral (DR)—an individual or family is referred to secondary processing due to at least one answer on a declaration;

Technical Referral (TR)—an individual or family is referred to secondary processing due to a technical processing error at a kiosk or during a lockout period when the kiosk cannot be used;

Biometric Failure (BF)—an individual or family is referred to secondary processing due to an error collecting biometric information at a kiosk;

Entry Authorization (EA)—an individual or family is referred to secondary processing due to a lack of an approved Electronic System for Travel Authorization (ESTA) entry on file; and Passage Granted (PG)—an individual is free to pass.

If a referral to secondary processing is needed, an indicator 1150 can be placed on the receipt or graphical display 1100. In this example, the indicator 1150 represents a large "X" placed across the receipt or graphical display 1100. However, any other suitable indicator could be used to identify whether secondary processing is needed. Alternatively, no indicator 1150 is provided, and customs/border enforcement personnel could use the referral code or other information to refer travelers to secondary processing.

In some embodiments, the information 1104 on the receipt 1100 could include other kinds of codes. For example, if an individual is free to pass the customs/border enforcement area, the individual may also be eligible for entry to prioritized screening at a security checkpoint, such as a TSA PreCheck line. In such a case, a code or symbol may appear along with the referral code. In some embodiments, a second receipt 1100 may be printed or displayed on a portable device. The second receipt 1100 could be specifically for entry into the prioritized screening area.

Although FIGS. 11A and 11B illustrate examples of printed receipts or graphical displays supporting compliance with customs/border requirements, various changes may be made to FIGS. 11A and 11B. For example, the content and arrangement of receipts and graphical displays can vary widely depending on particular needs.

Figure 12A:
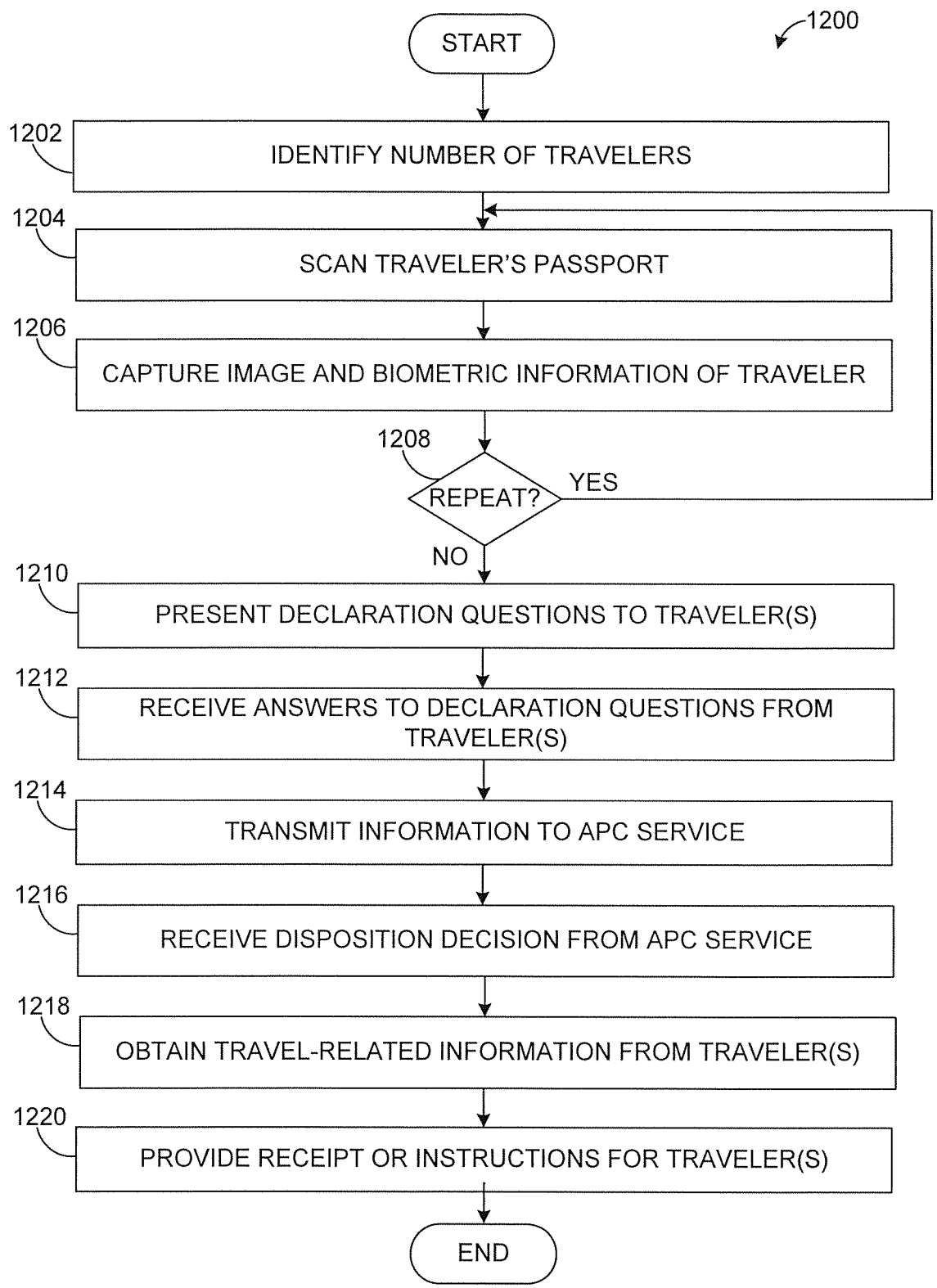
FIGS. 12A through 12C illustrate example methods for supporting compliance with customs/border requirements according to this disclosure.
Figure 12B:
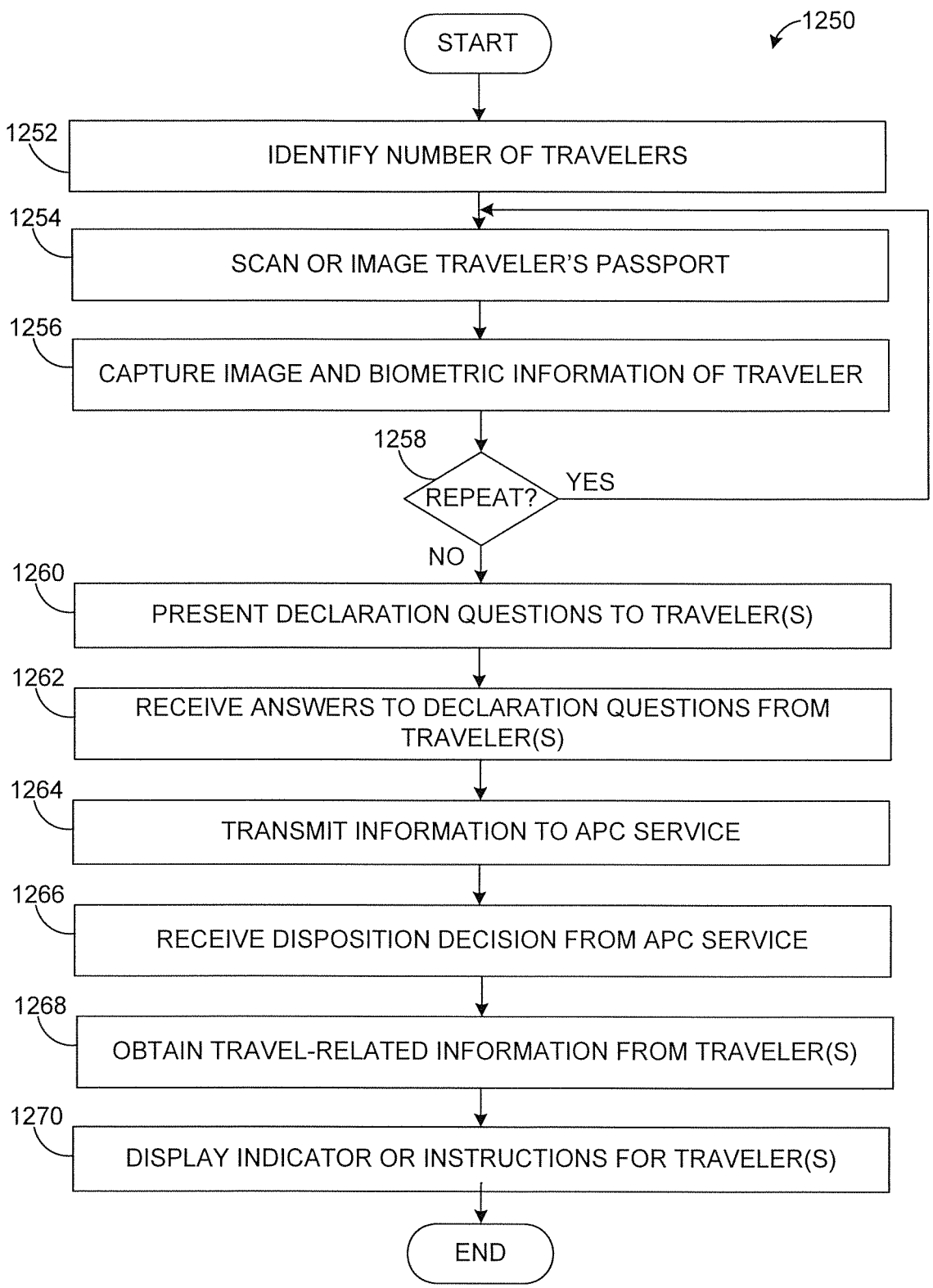
Figure 12C:
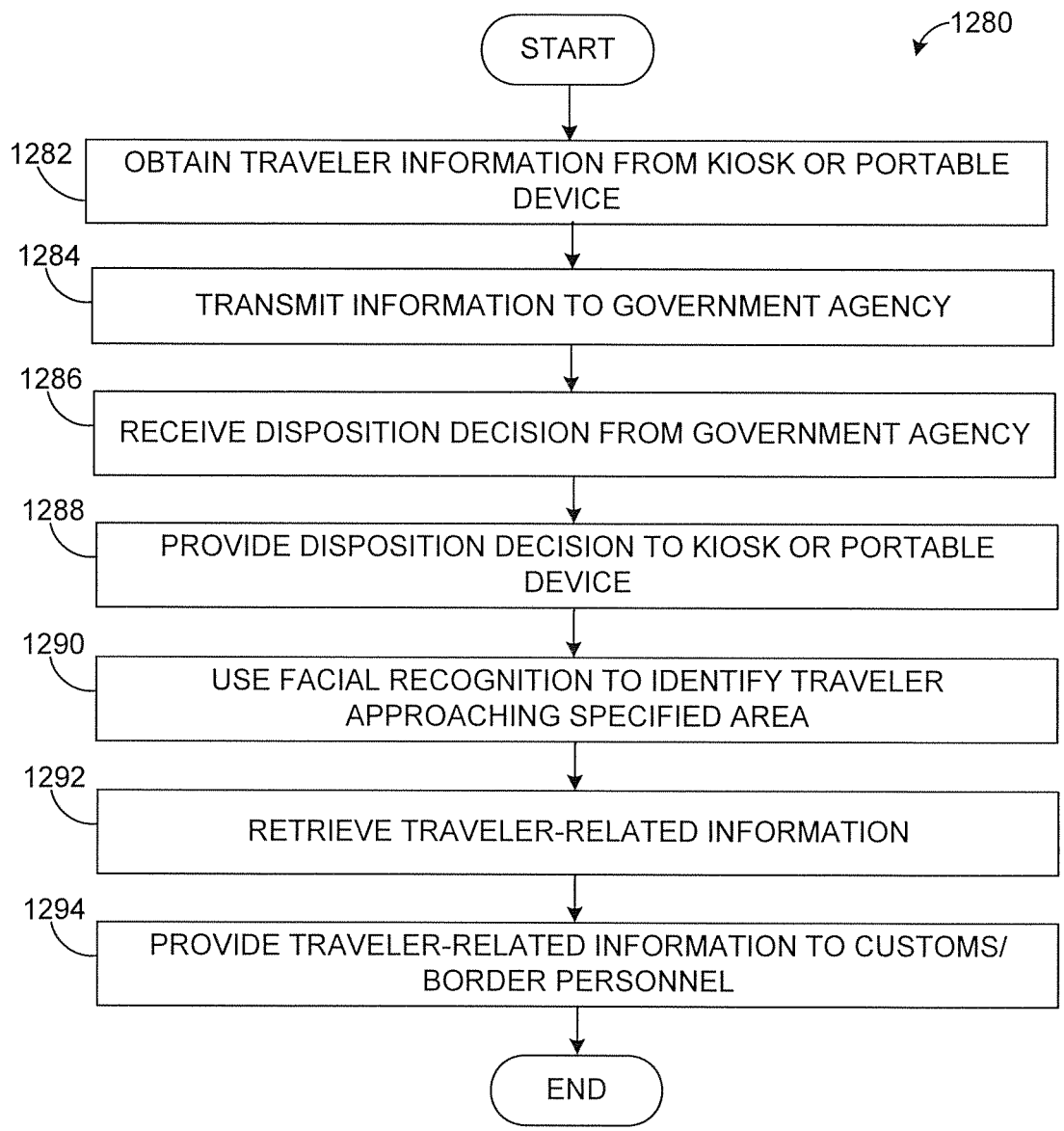

FIGS. 12A through 12C illustrate example methods for supporting compliance with customs/border requirements according to this disclosure. In particular, FIG. 12A illustrates an example method 1200 that could be used by a kiosk (such as any of the kiosks 118, 202a-202n, 302a-302n, 402a-402n, 420a-420m, 502, 800) that interacts with an APC service. FIG. 12B illustrates an example method 1250 that could be used by a portable device (such as any of the portable devices 124, 320) that interacts with an APC service. FIG. 12C illustrates an example method 1280 that could be used by an APC service that interacts with a kiosk, a portable device, or both.

As shown in FIG. 12A, a number of travelers is identified at step 1202. This could include, for example, a kiosk asking a traveler how many people are in the traveler's party. The traveler could select a "1" to indicate the traveler is alone or a value greater than one to indicate the traveler is in a group.

A first passport scan occurs at step 1204. This could include, for example, the kiosk scanning the passport of the sole traveler or the first traveler in the group. The passport scan could occur in any suitable manner, such as by using MRZ or RFID scans. Note that manual entry of information about the traveler's passport could also occur. A photo of the traveler is captured at step 1206. This could include, for example, the kiosk triggering a camera in the kiosk. The traveler here could be asked to stand at a specified location or otherwise take steps to ensure that the captured image complies with various requirements. Biometric information can also be captured, such as when the kiosk digitally captures fingerprints from certain fingers of the traveler or a retinal scan of one or more eyes of the traveler.

A determination is made whether any remaining travelers need to be processed at step 1208. This could include, for example, the kiosk determining whether the specified number of travelers in the group has been processed. If not, the method 1200 returns to step 1204 to scan another traveler's passport.

The kiosk presents various declaration questions to the traveler(s) at step 1210. This could include, for example, the kiosk displaying questions about currency or monetary instruments and "duty free" exemptions, questions about imports, and questions about whether the traveler had close contact with livestock or other animals while outside the country. Answers to the questions are obtained at step 1212. This could include, for example, the kiosk obtaining touch inputs identifying the traveler's answer to each of the declaration questions.

Information is transmitted to an APC service at step 1214. This could include, for example, the kiosk transmitting the passport information, photos, biometric data, and declaration answers to an application server, which can forward the information to a CBP or other government agency. A disposition decision from the APC service is obtained at step 1216. This could include, for example, the kiosk receiving an indication whether the traveler(s) can proceed to egress or if secondary processing is needed. In some embodiments, this could also include, for example, the kiosk receiving an indication whether the traveler(s) can proceed to a prioritized screening area at a security checkpoint, such as a TSA PreCheck line. The indication is based on information from the CBP or other government agency.

Travel-related information is obtained from the traveler(s) at step 1218. This could include, for example, the kiosk obtaining arrival and departure cities, flight information, or other travel-related information from the traveler(s). A receipt or instructions are provided to the traveler at step 1220. This could include, for example, the kiosk generating a printed receipt or displaying instructions to proceed to baggage claim or an egress point. This could also include, for example, the kiosk generating a second printed receipt for entry to a prioritized screening area at a security checkpoint, such as a TSA PreCheck line.

As shown in FIG. 12B, the method 1250 includes multiple operations that are similar to corresponding operations of the method 1200, except that a portable device (such as a portable device of the traveler) is used instead of a kiosk. A number of travelers is identified at step 1252. This could include, for example, an "app" or other application accessed at the portable device asking a traveler how many people are in the traveler's party. The traveler could select a "1" to indicate the traveler is alone or a value greater than one to indicate the traveler is in a group. In some embodiments, the "app" is installed on the portable device and is usable when the traveler is outside a wireless or cellular network. For example, the traveler may access and use the app to provide travel information while flying. In other embodiments, the app may access a website or other computing resource and may exchange information about the traveler with the website or computing resource.

A first passport scan or imaging occurs at step 1254. This could include, for example, a camera of the portable device scanning or capturing an image of the passport of the sole traveler or the first traveler in the group. Note that manual entry of information about the traveler's passport could also occur. A photo of the traveler is captured at step 1256. This could include, the camera of the portable device capturing the photo. In some embodiments, if the portable device has the capability, biometric information can also be captured, such as by digitally capturing fingerprints from certain fingers of the traveler or a retinal or iris scan of one or more eyes of the traveler.

A determination is made whether any remaining travelers need to be processed at step 1258. This could include, for example, the portable device determining whether the specified number of travelers in the group has been processed. If not, the method 1250 returns to step 1254 to scan or image another traveler's passport.

The portable device presents various declaration questions to the traveler(s) at step 1260. This could include, for example, the portable device displaying questions about currency or monetary instruments and "duty free" exemptions, questions about imports, and questions about whether the traveler had close contact with livestock or other animals while outside the country. Answers to the questions are obtained at step 1262. This could include, for example, the portable device obtaining touch inputs identifying the traveler's answer to each of the declaration questions.

When the portable device is able to wirelessly connect to the Internet or other network, information is transmitted to an APC service at step 1264. This could include, for example, the portable device wirelessly transmitting the passport information, photos, biometric data, and declaration answers to an application server, which can forward the information to a CBP or other government agency. A disposition decision from the APC service is obtained at step 1266. This could include, for example, the portable device receiving an indication whether the traveler(s) can pass a customs/border enforcement area and proceed to egress, or if secondary processing within the customs/border enforcement area is needed. In some embodiments, this could also include, for example, the portable device receiving an indication whether the traveler(s) can proceed to a prioritized screening area at a security checkpoint, such as a TSA PreCheck line. The indication is based on information from the CBP or other government agency. In some embodiments, the indication can include a QR code, barcode, or other machine-readable indicator that is displayable on the display of the portable device and is able to be scanned or read by a machine or customs personnel in the customs/border enforcement area at the traveler's point of arrival.

Travel-related information is obtained from the traveler(s) at step 1268. This could include, for example, the portable device obtaining arrival and departure cities, flight information, or other travel-related information from the traveler(s). An indicator or instructions are displayed at step 1270. This could include, for example, the portable device displaying a QR code, barcode, or other indicator or instructions to proceed to baggage claim, proceed to an egress point of the customs/border enforcement area, or proceed to a kiosk in the customs/border enforcement area for further processing. This could also include, for example, the portable device displaying a code or other indicator allowing entry to a prioritized screening area at a security checkpoint, such as a TSA PreCheck line. The graphical indicator can be scanned at one or more points in the customs/border enforcement area. For example, if a traveler is required to proceed to a kiosk in the customs/border enforcement area for further processing, the graphical indicator can be displayed at the portable device and scanned at the kiosk to initiate a kiosk transaction and pre-generate traveler information at the kiosk. As another example, if a traveler is able to proceed to an egress point of the customs/border enforcement area, the graphical indicator can be scanned at the egress point to identify the traveler and allow the traveler to exit. If a traveler is required to proceed to a kiosk in the customs/border enforcement area for further processing, then one or more operations in the method 1200 may follow the method 1250.

As shown in FIG. 12C, the method 1280 includes obtaining traveler information from a kiosk, a portable device, or both at step 1282. This could include, for example, an application server obtaining passport information, photos, biometric data, and declaration answers from a kiosk, a portable device of a traveler, or both. The information is transmitted to a government agency at step 1284. This could include, for example, the application server transmitting the information to a CBP system or other system that can check for criminal, terrorist, or other issues with respect to a traveler. A disposition decision is received from the government agency at step 1286 and provided to the kiosk or portable device at step 1288. The disposition decision indicates whether the traveler is free to proceed to egress or if secondary processing is needed for the traveler as determined by the CBP system or other system. In some embodiments, the disposition decision could also indicate whether the traveler can proceed to a prioritized screening area at a security checkpoint, such as a TSA PreCheck line.

Assuming the traveler proceeds from the kiosk to another area, facial recognition is used to identify the traveler at step 1290. This could include, for example, the application server using images from security cameras, cameras in portable devices used by customs/border personnel, or other cameras to identify when the traveler approaches customs/border personnel in a given area (such as an egress area or a secondary processing area).

In response to identifying the traveler, traveler-related information is retrieved at step 1292 and provided to customs/border personnel at step 1294. This could include, for example, the application server retrieving the same information previously provided by the kiosk and stored in a database. This could also include the application server retrieving information obtained from the government agency and stored in a database. In this way, the customs/border personnel are able to obtain and view information about the traveler when the traveler is attempting to exit a location or is undergoing secondary processing. Note that the use of facial recognition is optional here and that manual passport scans, iris scans, retinal scans, fingerprint scans, or other mechanism(s) could be used to identify a traveler and provide the traveler's information to customs/border personnel.

At any point during these processes, one or more traveler could be instructed to proceed to secondary processing. For example, if a traveler's passport cannot be scanned, alterations are detected to a passport, or a fraudulent passport is detected, the traveler could be instructed to proceed to secondary processing. As another example, if a traveler is determined to be ineligible to proceed to egress without secondary processing, the kiosk or the traveler's portable device could obtain information from the traveler and then instruct the traveler to proceed to secondary processing without waiting for a disposition decision. As yet another example, some passports include integrated circuit chips that include one or more photographs of the person to whom the passport is issued, and that information could be retrieved by a kiosk or read by a portable device. Facial recognition can be used to determine whether the traveler attempting to secure passage through a customs/border checkpoint is the same person to whom the traveler's passport is issued, and if not the traveler could be instructed to proceed to secondary processing without waiting for a disposition decision.

Although FIGS. 12A through 12C illustrate examples of methods for supporting compliance with customs/border requirements, various changes may be made to FIGS. 12A through 12C. For example, while shown as a series of steps, the steps in each figure could overlap, occur in parallel, occur in a different order, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving, at a portable device, first information associated with a traveler, wherein the first information comprises information from a passport of the traveler, a photograph of the traveler, and travel-related information associated with the traveler;
wirelessly transmitting, by the portable device, at least a portion of the first information to an external system associated with a customs or border enforcement agency;
receiving, at the portable device, from the external system in response to the at least portion of the first information, second information associated with a first receipt and third information associated with a second receipt, wherein the first receipt comprises a disposition code that indicates whether the traveler is allowed to pass a customs or border enforcement area or is required to enter the customs or border enforcement area for additional processing, and wherein the second receipt indicates whether the traveler is allowed entry into a prioritized screening area at a security checkpoint;
presenting the disposition code on a display of the portable device when the traveler is located at a kiosk or egress point of the customs or border enforcement area, wherein the presented disposition code is machine-readable at the kiosk or egress point of the customs or border enforcement area; and
presenting the second receipt on the display of the portable device after the traveler leaves the customs or border enforcement area and the traveler is located near the security checkpoint, wherein the second receipt is machine readable at the security checkpoint to enable entry into the prioritized screening area at the security checkpoint.

2. The method of claim 1, wherein the presented disposition code comprises a QR code.

3. The method of claim 1, wherein receiving the first information associated with the traveler comprises:
presenting one or more declaration questions to the traveler; and
receiving one or more answers for the one or more declaration questions.

4. The method of claim 1, wherein receiving the first information associated with the traveler comprises:
capturing, by a camera of the portable device, at least one of: the information from the passport of the traveler or the photograph of the traveler.

5. The method of claim 1, wherein receiving the first information associated with the traveler comprises:
presenting one or more prompts to input the travel-related information, wherein the travel-related information comprises a departure location for the traveler, an arrival location for the traveler, and flight information associated with the traveler.

6. An apparatus comprising:
at least one processor configured to receive first information associated with a traveler, wherein the first information comprises information from a passport of the traveler, a photograph of the traveler, and travel-related information associated with the traveler;
a transceiver configured to wirelessly transmit at least a portion of the first information to an external system associated with a customs or border enforcement agency and receive, from the external system in response to the at least portion of the first information, second information associated with a first receipt and third information associated with a second receipt, wherein the first receipt comprises a disposition code that indicates whether the traveler is allowed to pass a customs or border enforcement area or is required to enter the customs or border enforcement area for additional processing, and wherein the second receipt indicates whether the traveler is allowed entry into a prioritized screening area at a security checkpoint; and
a display configured to:
present the disposition code when the traveler is located at a kiosk or egress point of the customs or border enforcement area, wherein the presented disposition code is machine-readable at the kiosk or egress point of the customs or border enforcement area; and
present the second receipt on the display of the apparatus after the traveler leaves the customs or border enforcement area and the traveler is located near the security checkpoint, wherein the second receipt is machine readable at the security checkpoint to enable entry into the prioritized screening area at the security checkpoint.

7. The apparatus of claim 6, wherein the presented disposition code comprises a QR code.

8. The apparatus of claim 6, wherein:
the display is configured to present one or more declaration questions to the traveler; and
the at least one processor is configured to receive one or more answers for the one or more declaration questions.

9. The apparatus of claim 6, further comprising:
a camera configured to capture at least one of: the information from the passport of the traveler or the photograph of the traveler.

10. The apparatus of claim 6, wherein:
the display is configured to present one or more prompts to input the travel-related information; and
the travel-related information comprises a departure location for the traveler, an arrival location for the traveler, and flight information associated with the traveler.

11. A non-transitory computer readable medium containing instructions that, when executed by at least one processor of a portable device, cause the at least one processor to:
receive first information associated with a traveler at the portable device, wherein the first information comprises information from a passport of the traveler, a photograph of the traveler, and travel-related information associated with the traveler;
initiate wireless transmission of at least a portion of the first information to an external system associated with a customs or border enforcement agency;
receive, from the external system in response to the at least portion of the first information, second information associated with a first receipt and third information associated with a second receipt, wherein the first receipt comprises a disposition code that indicates whether the traveler is allowed to pass a customs or border enforcement area or is required to enter the customs or border enforcement area for additional processing, and wherein the second receipt indicates whether the traveler is allowed entry into a prioritized screening area at a security checkpoint;
present the disposition code on a display of the portable device when the traveler is located at a kiosk or egress point of the customs or border enforcement area, wherein the presented disposition code is machine-readable at the kiosk or egress point of the customs or border enforcement area; and
present the second receipt on the display of the portable device after the traveler leaves the customs or border enforcement area and the traveler is located near the security checkpoint, wherein the second receipt is machine readable at the security checkpoint to enable entry into the prioritized screening area at the security checkpoint.

12. The non-transitory computer readable medium of claim 11, wherein the presented disposition code comprises a QR code.

13. The non-transitory computer readable medium of claim 11, further containing instructions that, when executed by the at least one processor, cause the at least one processor to:
present one or more declaration questions to the traveler; and
receive one or more answers for the one or more declaration questions.

14. The non-transitory computer readable medium of claim 11, wherein the instructions that when executed cause the at least one processor to receive the information associated with the traveler comprise:
instructions that when executed cause the at least one processor to control a camera of the portable device to capture at least one of: the information from the passport of the traveler or the photograph of the traveler.

15. The non-transitory computer readable medium of claim 11, wherein the instructions that when executed cause the at least one processor to receive the information associated with the traveler comprise:
instructions that when executed cause the at least one processor to present one or more prompts to input the travel-related information;
wherein the travel-related information comprises a departure location for the traveler, an arrival location for the traveler, and flight information associated with the traveler.

16. A method comprising:
receiving, from a portable device of a traveler, first information associated with the traveler, wherein the first information comprises information from a passport of the traveler, a photograph of the traveler, and travel-related information associated with the traveler;
providing at least a portion of the first information to an external system associated with a customs or border enforcement agency;
receiving, from the external system in response to the at least portion of the first information, second information associated with a first receipt and third information associated with a second receipt, wherein the first receipt comprises a disposition code that indicates whether the traveler is allowed to pass a customs or border enforcement area or is required to enter the customs or border enforcement area for additional processing, and wherein the second receipt indicates whether the traveler is allowed entry into a prioritized screening area at a security checkpoint; and providing the second information associated with the first receipt and the third information associated with the second receipt to the portable device for presentation on a display of the portable device, wherein the disposition code, when presented on a display of the portable device when the traveler is located at a kiosk or egress point of the customs or border enforcement area, is machine-readable at the kiosk or egress point of the customs or border enforcement area, and wherein the second receipt, when presented on the display of the portable device after the traveler leaves the customs or border enforcement area and the traveler is located near the security checkpoint, is machine readable at the security checkpoint to enable entry into the prioritized screening area at the security checkpoint.

17. The method of claim 16, further comprising:
detecting the disposition code on the display of the portable device upon a scan of the display; and
opening an egress point of the customs or border enforcement area for the traveler in response to determining that the disposition code indicates that the traveler is allowed to pass the customs or border enforcement area.

18. The method of claim 16, further comprising:
when the disposition code indicates that the traveler is required to enter the customs or border enforcement area for additional processing, receiving fourth information associated with the traveler at the kiosk; and
in response to receiving the fourth information, providing a second disposition code to the portable device for presentation on the display of the portable device, the second disposition code indicating that the traveler is allowed to exit the customs or border enforcement area.

19. A system comprising:
at least one computing device configured to:
receive, from a portable device of a traveler, first information associated with the traveler, wherein the first information comprises information from a passport of the traveler, a photograph of the traveler, and travel-related information associated with the traveler;
provide at least a portion of the first information to an external system associated with a customs or border enforcement agency;
receive, from the external system in response to the at least portion of the first information, second information associated with a first receipt and third information associated with a second receipt, wherein the first receipt comprises a disposition code that indicates whether the traveler is allowed to pass a customs or border enforcement area or is required to enter the customs or border enforcement area for additional processing, and wherein the second receipt indicates whether the traveler is allowed entry into a prioritized screening area at a security checkpoint; and
provide the second information associated with the first receipt and the third information associated with the second receipt to the portable device for presentation on a display of the portable device,
wherein the disposition code, when presented on a display of the portable device when the traveler is located at a kiosk or egress point of the customs or border enforcement area, is machine-readable at the kiosk or egress point of the customs or border enforcement area, and wherein the second receipt, when presented on the display of the portable device after the traveler leaves the customs or border enforcement area and the traveler is located near the security checkpoint, is machine readable at the security checkpoint to enable entry into the prioritized screening area at the security checkpoint.

20. The system of claim 19, further comprising:
a scanner configured to scan the disposition code on the display of the portable device upon a scan of the display;
wherein the at least one computing device is further configured to:
determine that the disposition code indicates that the traveler is allowed to pass the customs or border enforcement area; and
control an egress point of the customs or border enforcement area to open for the traveler in response to the determination.

21. The system of claim 19, further comprising:
the kiosk, configured to receive fourth information associated with the traveler when the disposition code indicates that the traveler is required to enter the customs or border enforcement area for additional processing;
wherein the at least one computing device is further configured, in response to receiving the fourth information, to provide a second disposition code to the portable device for presentation on the display of the portable device, the second disposition code indicating that the traveler is allowed to exit the customs or border enforcement area.

22. A non-transitory computer readable medium containing instructions that, when executed by at least one processor, cause the at least one processor to:
receive, from a portable device of a traveler, first information associated with the traveler, wherein the first information comprises information from a passport of the traveler, a photograph of the traveler, and travel-related information associated with the traveler;
provide at least a portion of the first information to an external system associated with a customs or border enforcement agency;
receive, from the external system in response to the at least portion of the first information, second information associated with a first receipt and third information associated with a second receipt, wherein the first receipt comprises a disposition code that indicates whether the traveler is allowed to pass a customs or border enforcement area or is required to enter the customs or border enforcement area for additional processing, and wherein the second receipt indicates whether the traveler is allowed entry into a prioritized screening area at a security checkpoint; and
provide the second information associated with the first receipt and the third information associated with the second receipt to the portable device for presentation on a display of the portable device,
wherein the disposition code, when presented on a display of the portable device when the traveler is located at a kiosk or egress point of the customs or border enforcement area, is machine-readable at the kiosk or egress point of the customs or border enforcement area; and
wherein the second receipt, when presented on the display of the portable device after the traveler leaves the customs or border enforcement area and the traveler is located near the security checkpoint, is machine readable at the security checkpoint to enable entry into the prioritized screening area at the security checkpoint.

23. The non-transitory computer readable medium of claim 22, further containing instructions that, when executed by the at least one processor, cause the at least one processor to:
- detect the disposition code on the display of the portable device upon a scan of the display; and
- open an egress point of the customs or border enforcement area for the traveler in response to determining that the disposition code indicates that the traveler is allowed to pass the customs or border enforcement area.

24. The non-transitory computer readable medium of claim 22, further containing instructions that, when executed by the at least one processor, cause the at least one processor to:
- when the disposition code indicates that the traveler is required to enter the customs or border enforcement area for additional processing, receive fourth information associated with the traveler at the kiosk; and
- in response to receiving the fourth information, provide a second disposition code to the portable device for presentation on the display of the portable device, the second disposition code indicating that the traveler is allowed to exit the customs or border enforcement area.

* * * * *